Nov. 24, 1936.                J. W. BRYCE ET AL                 2,062,118
              ACCOUNTING MACHINE WITH SUPPLEMENTAL RECORDER
                     Filed July 19, 1932        21 Sheets-Sheet 1
FIG.1.
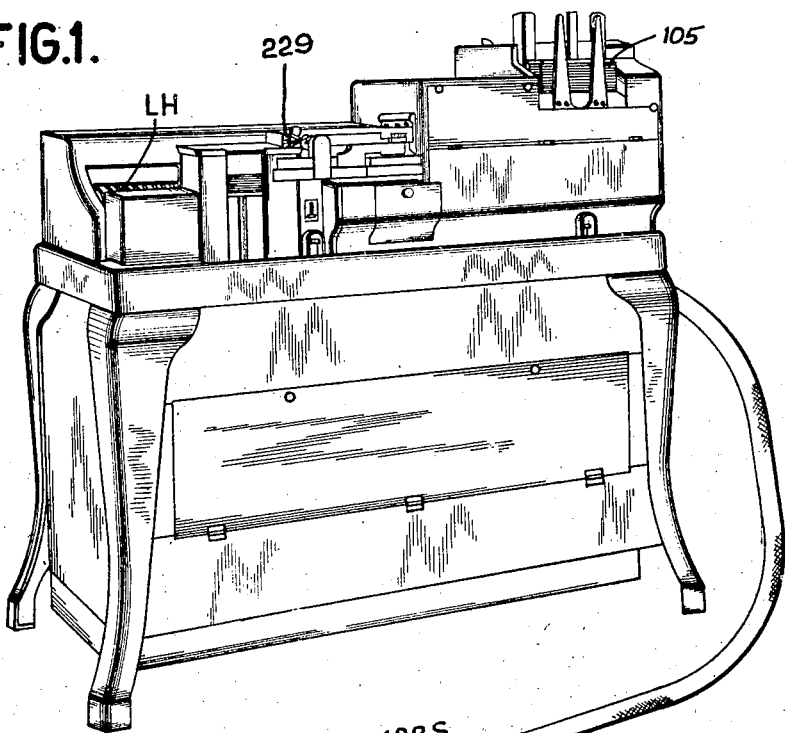
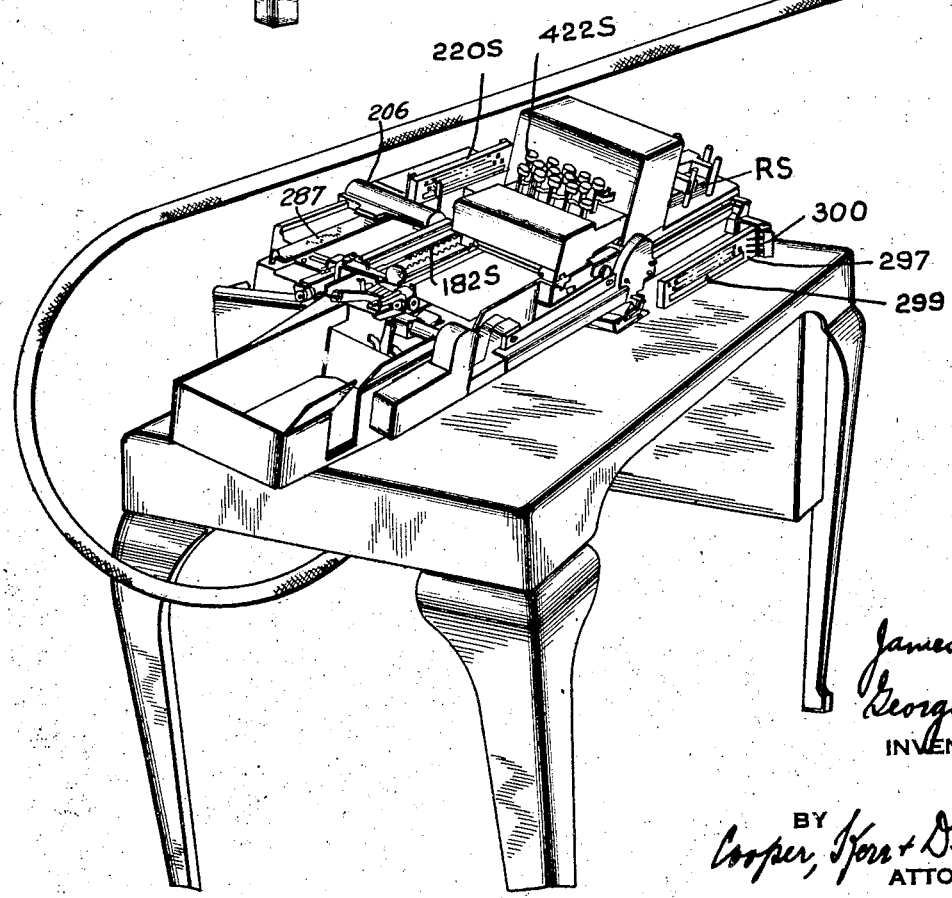
James W. Bryce
George F. Daly
INVENTORS
BY Cooper, Kerr + Dunham
ATTORNEYS Nov. 24, 1936.  J. W. BRYCE ET AL  2,062,118
ACCOUNTING MACHINE WITH SUPPLEMENTAL RECORDER
Filed July 19, 1932  21 Sheets-Sheet 2
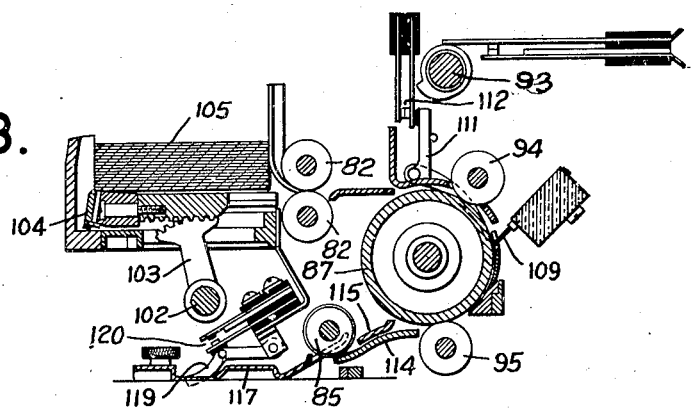
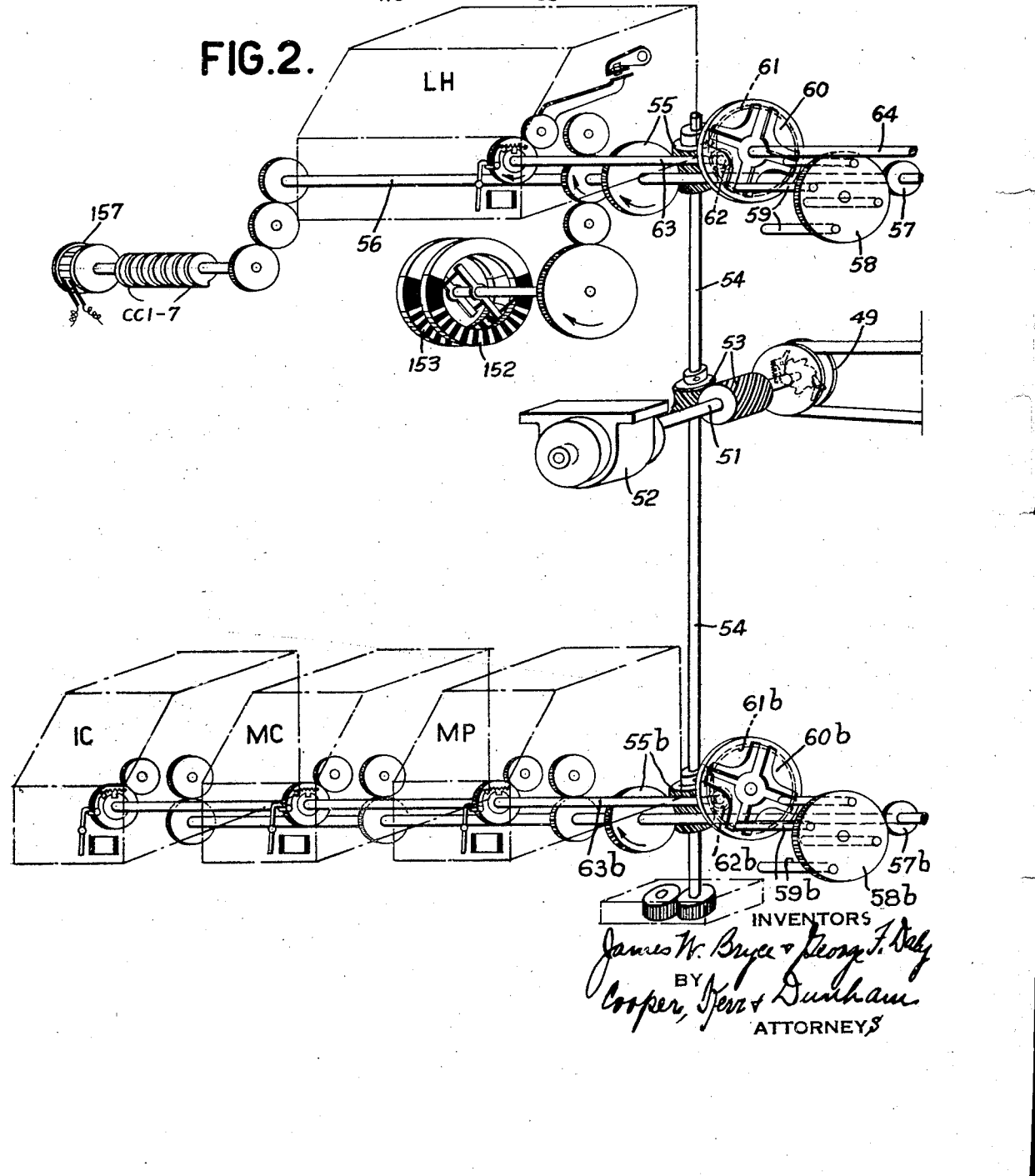

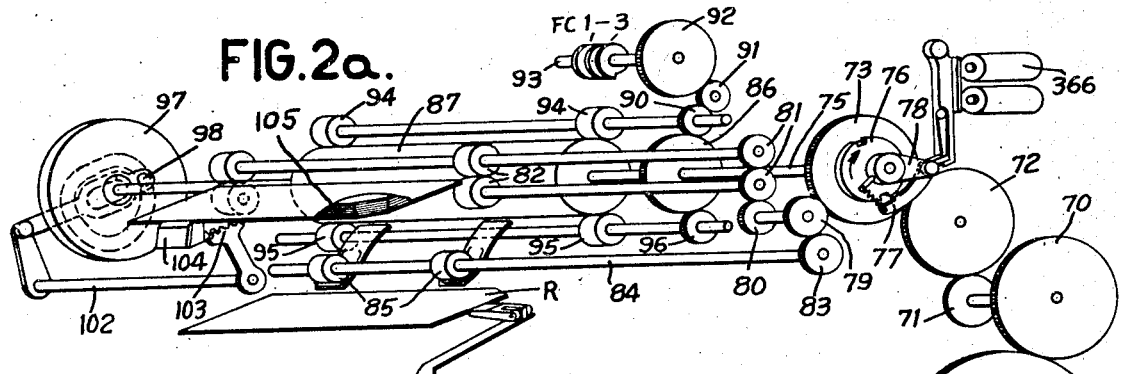
FIG.2a.
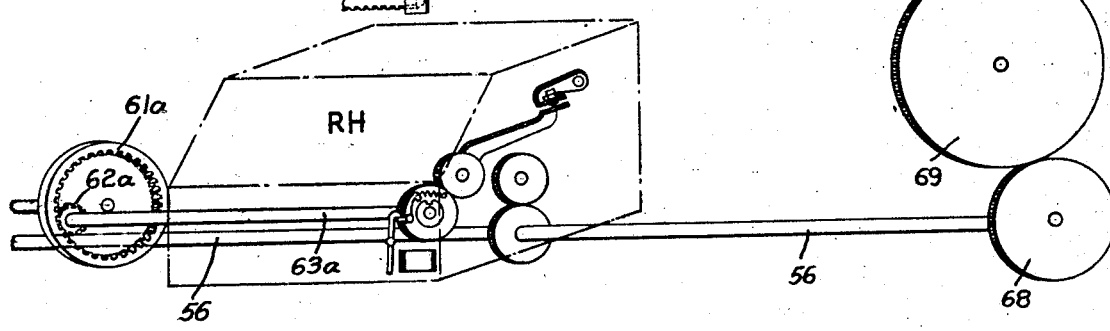

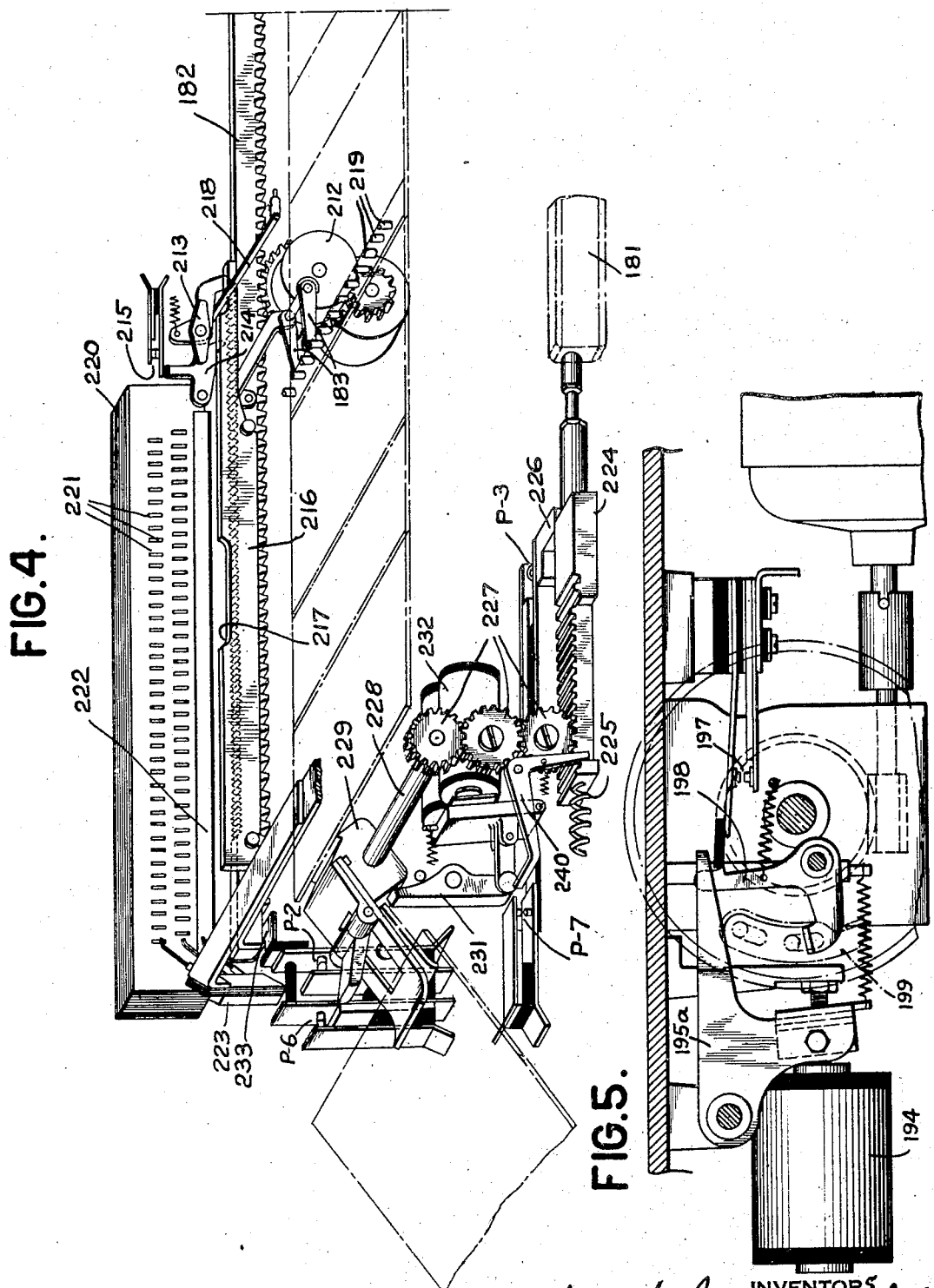

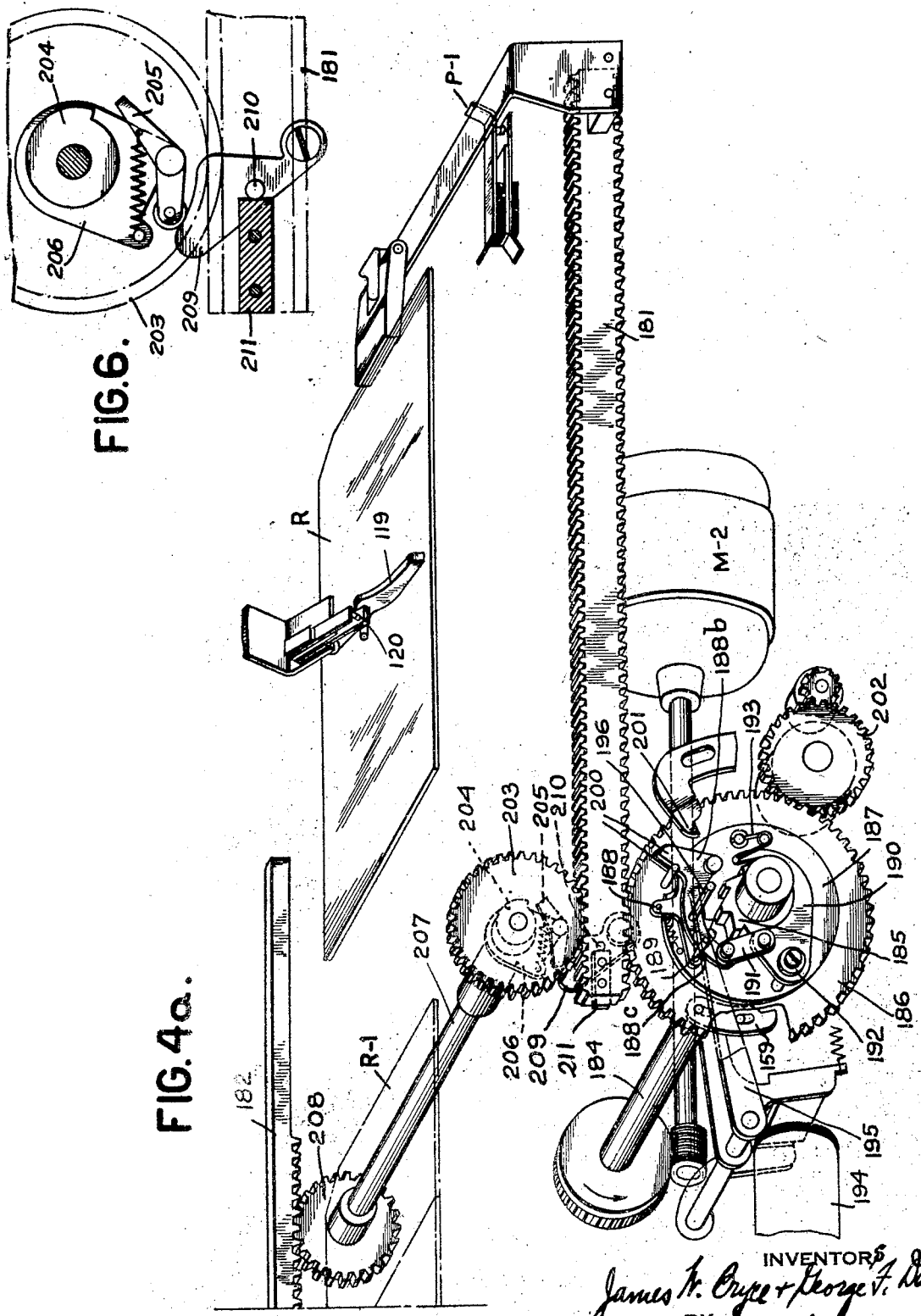

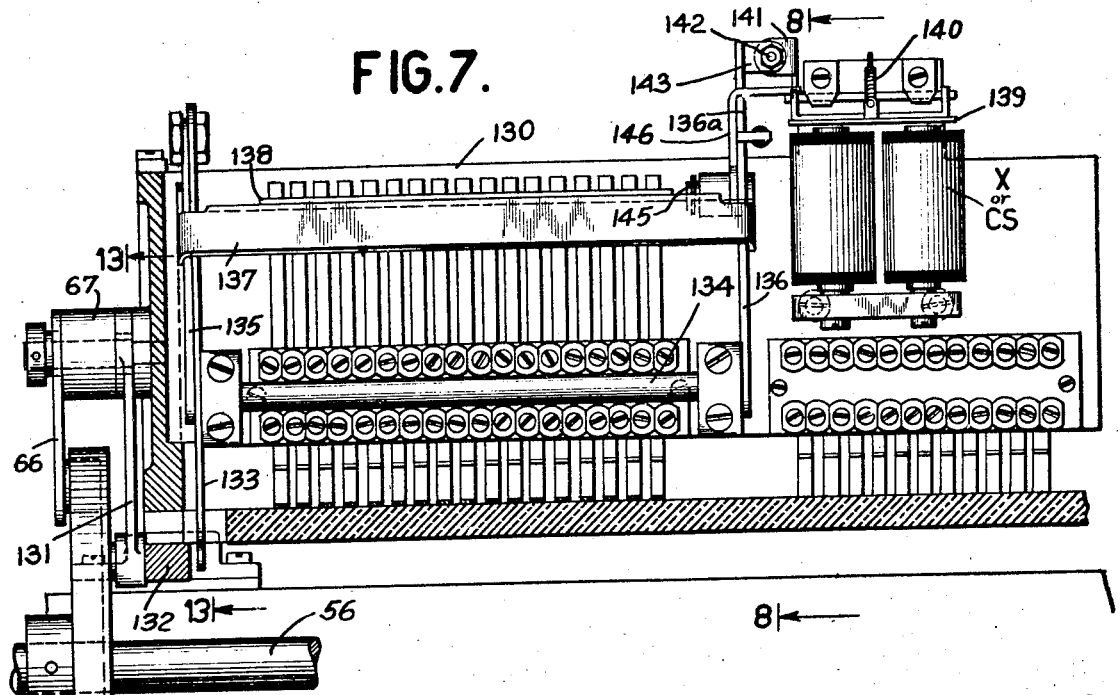
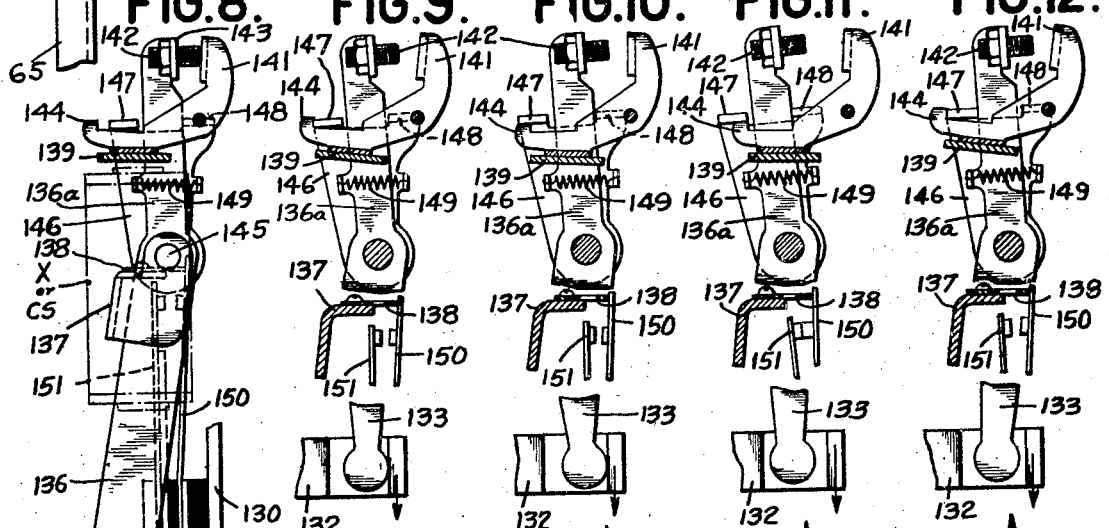

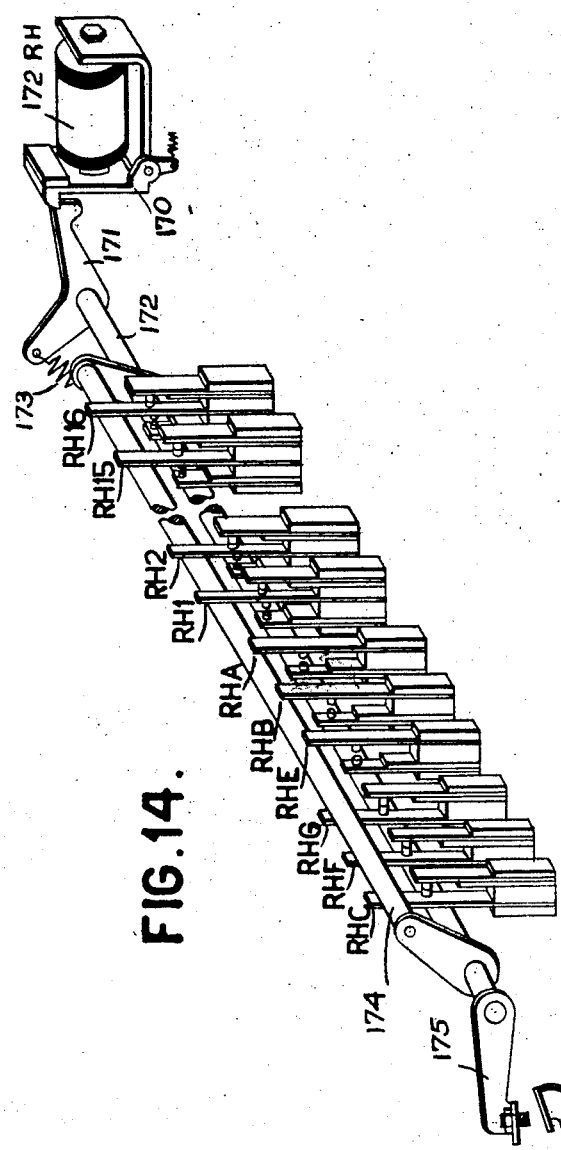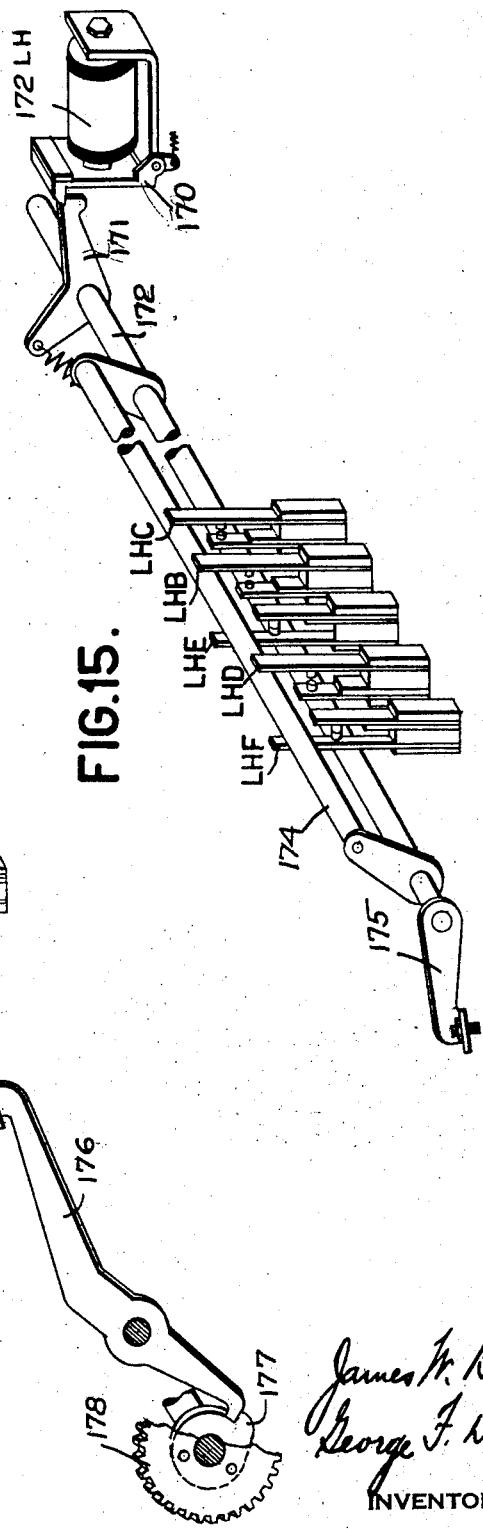

Nov. 24, 1936.  J. W. BRYCE ET AL  2,062,118
ACCOUNTING MACHINE WITH SUPPLEMENTAL RECORDER
Filed July 19, 1932  21 Sheets-Sheet 8
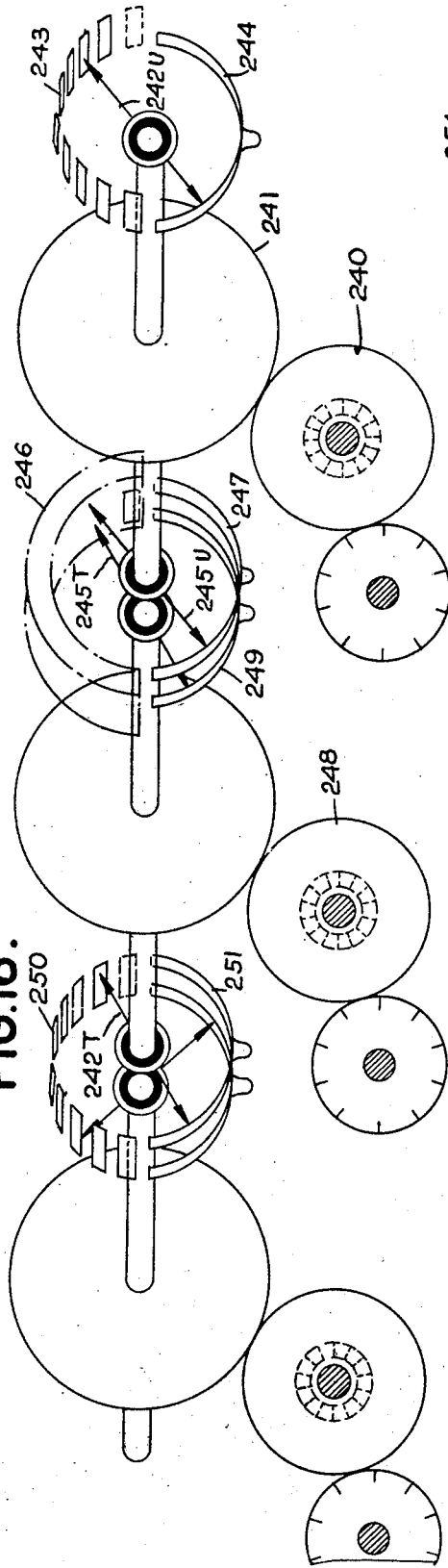
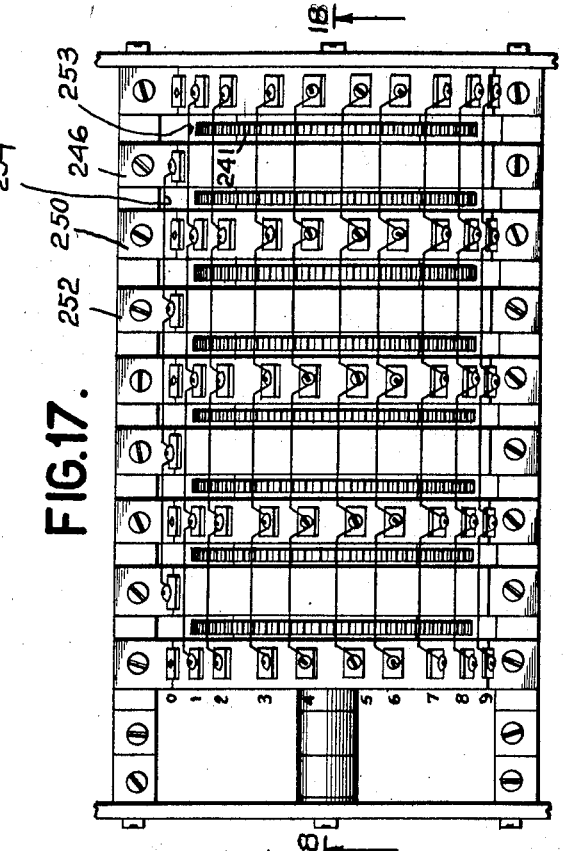
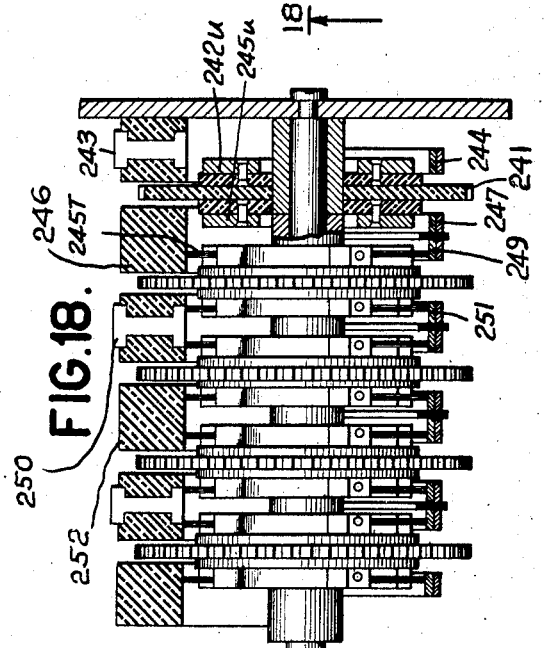

Nov. 24, 1936.  J. W. BRYCE ET AL  2,062,118
ACCOUNTING MACHINE WITH SUPPLEMENTAL RECORDER
Filed July 19, 1932  21 Sheets-Sheet 9
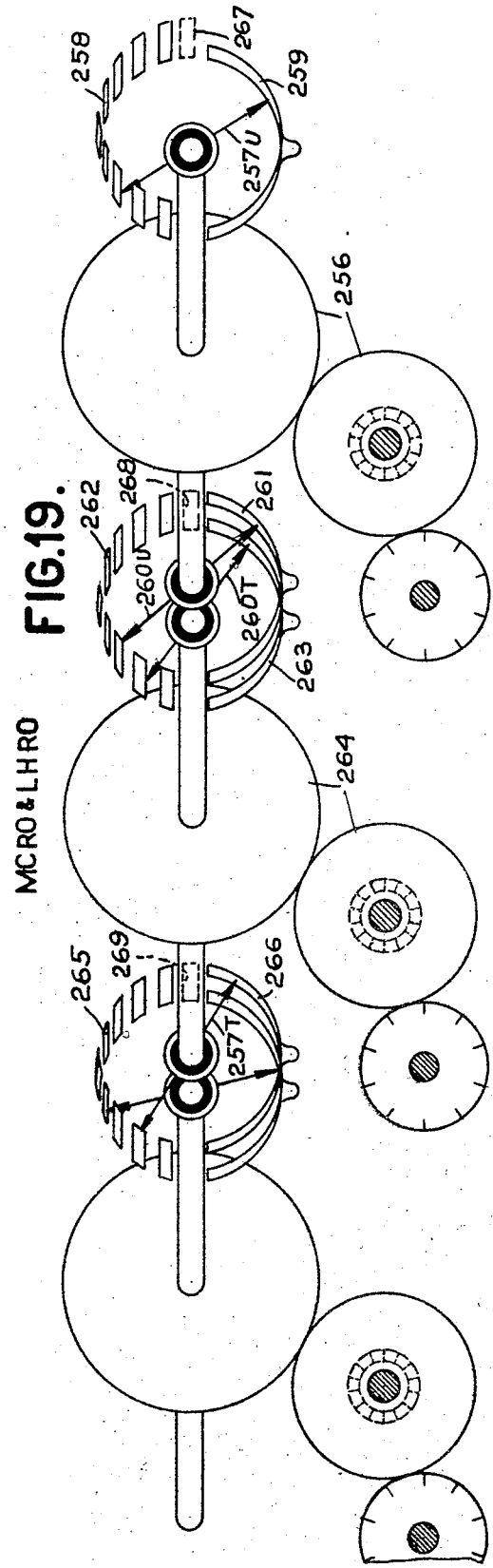
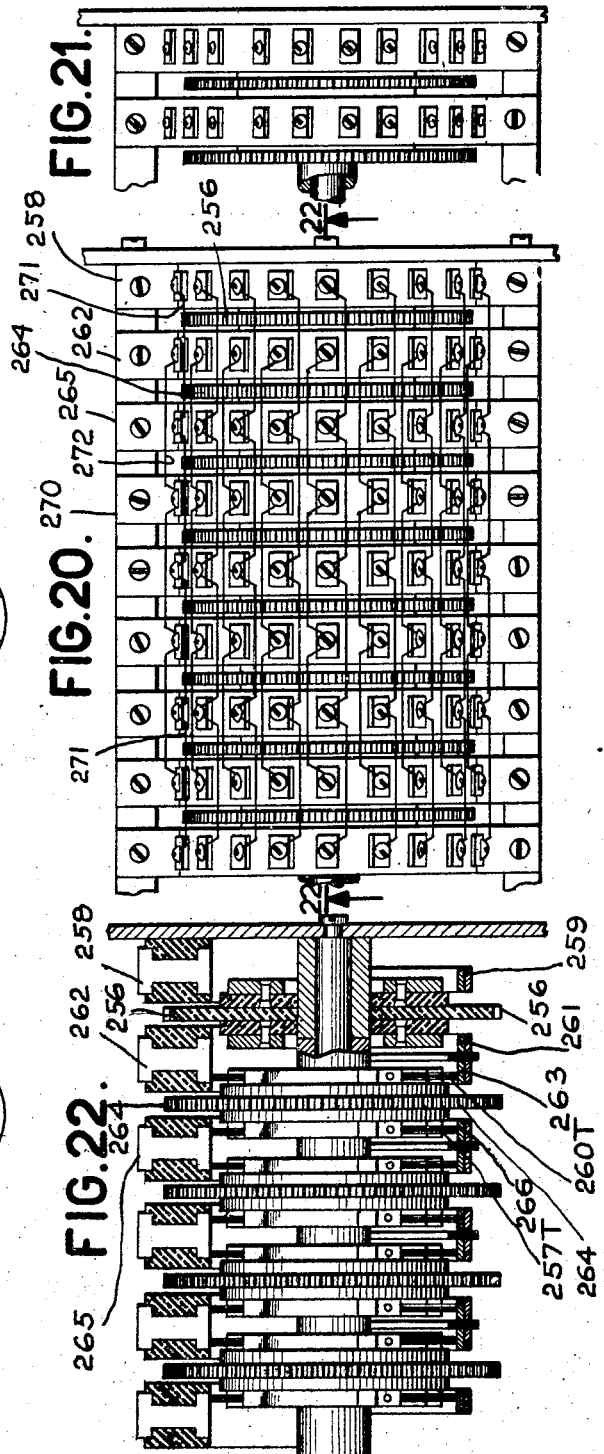

Nov. 24, 1936.  J. W. BRYCE ET AL  2,062,118
ACCOUNTING MACHINE WITH SUPPLEMENTAL RECORDER
Filed July 19, 1932  21 Sheets-Sheet 10
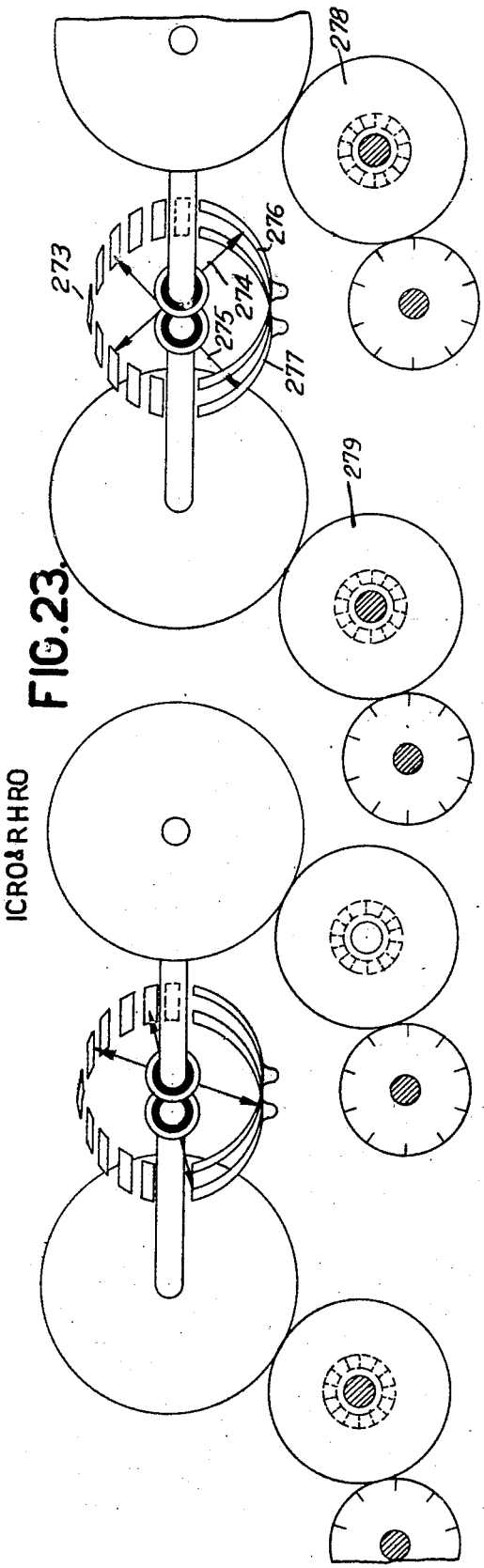
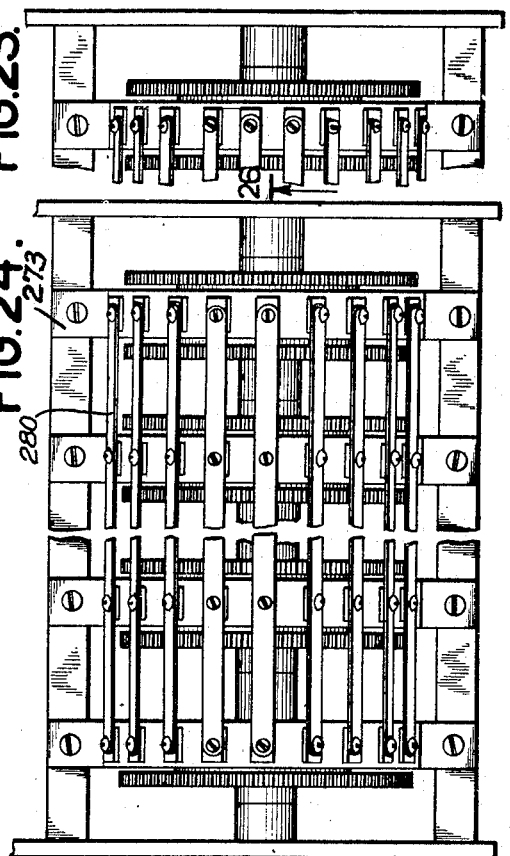
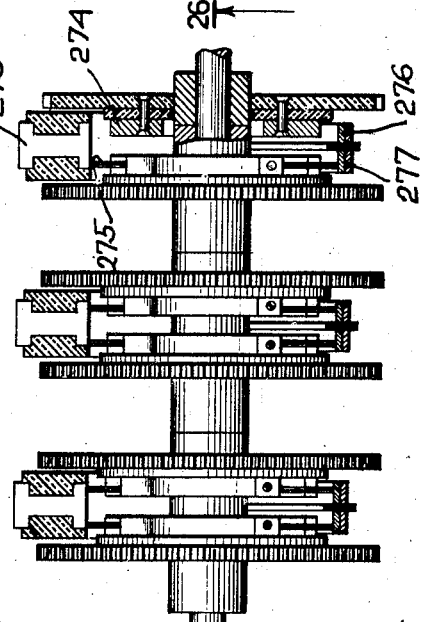

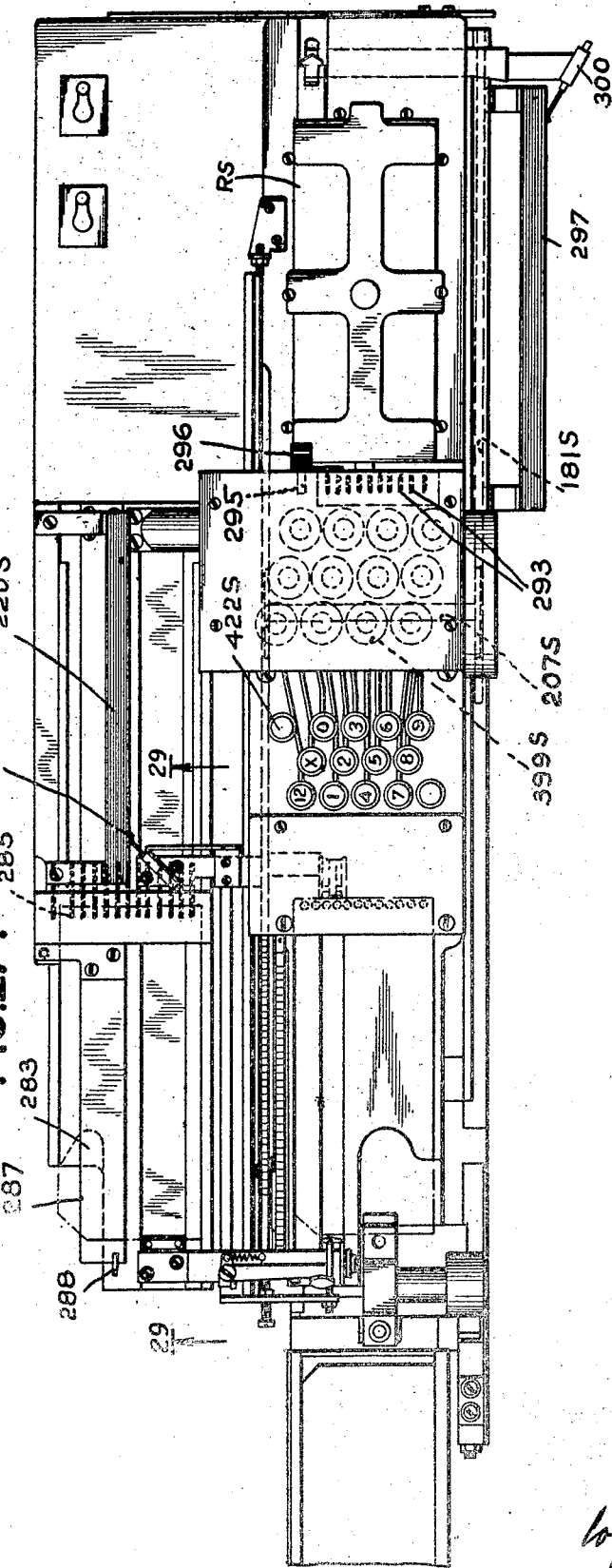

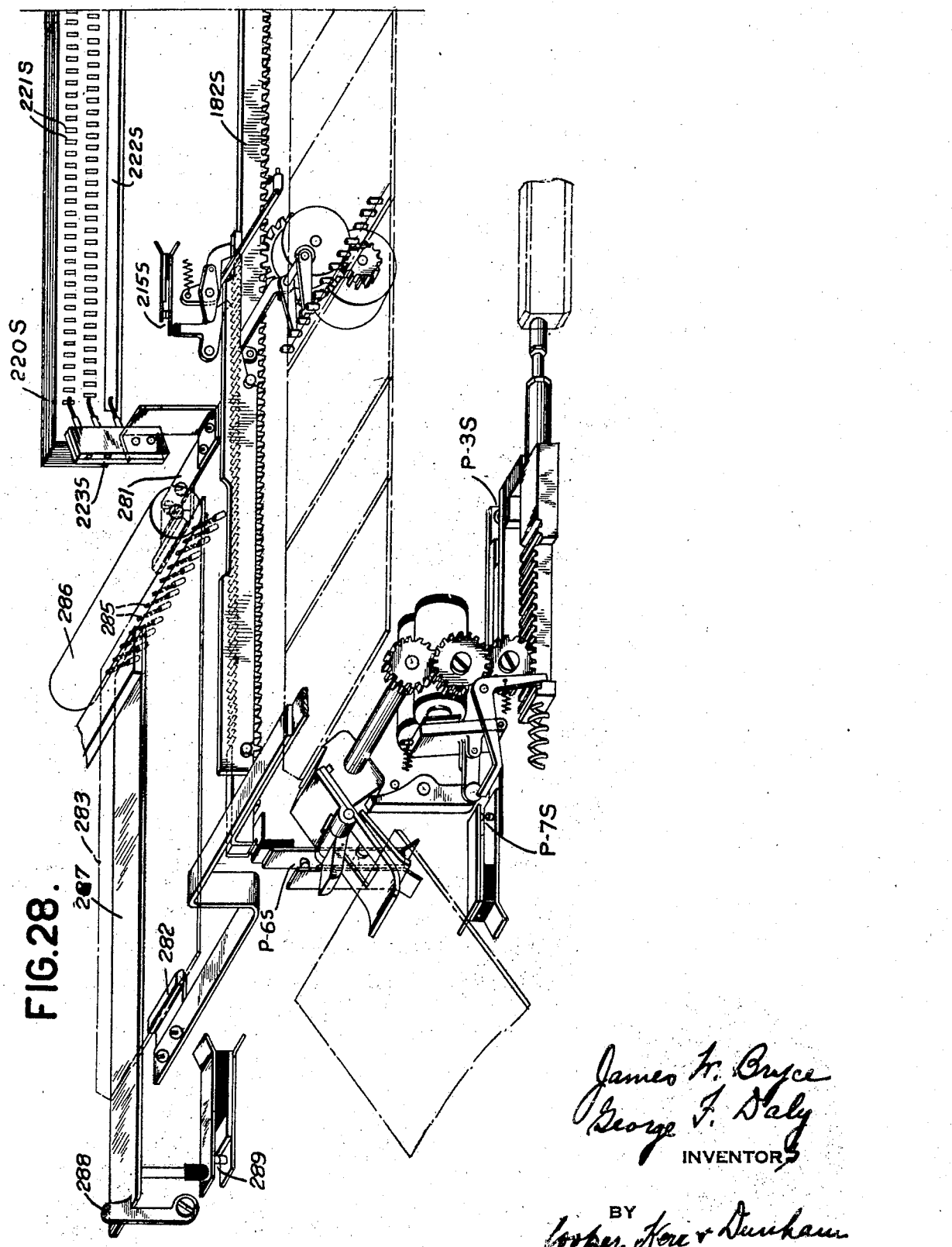

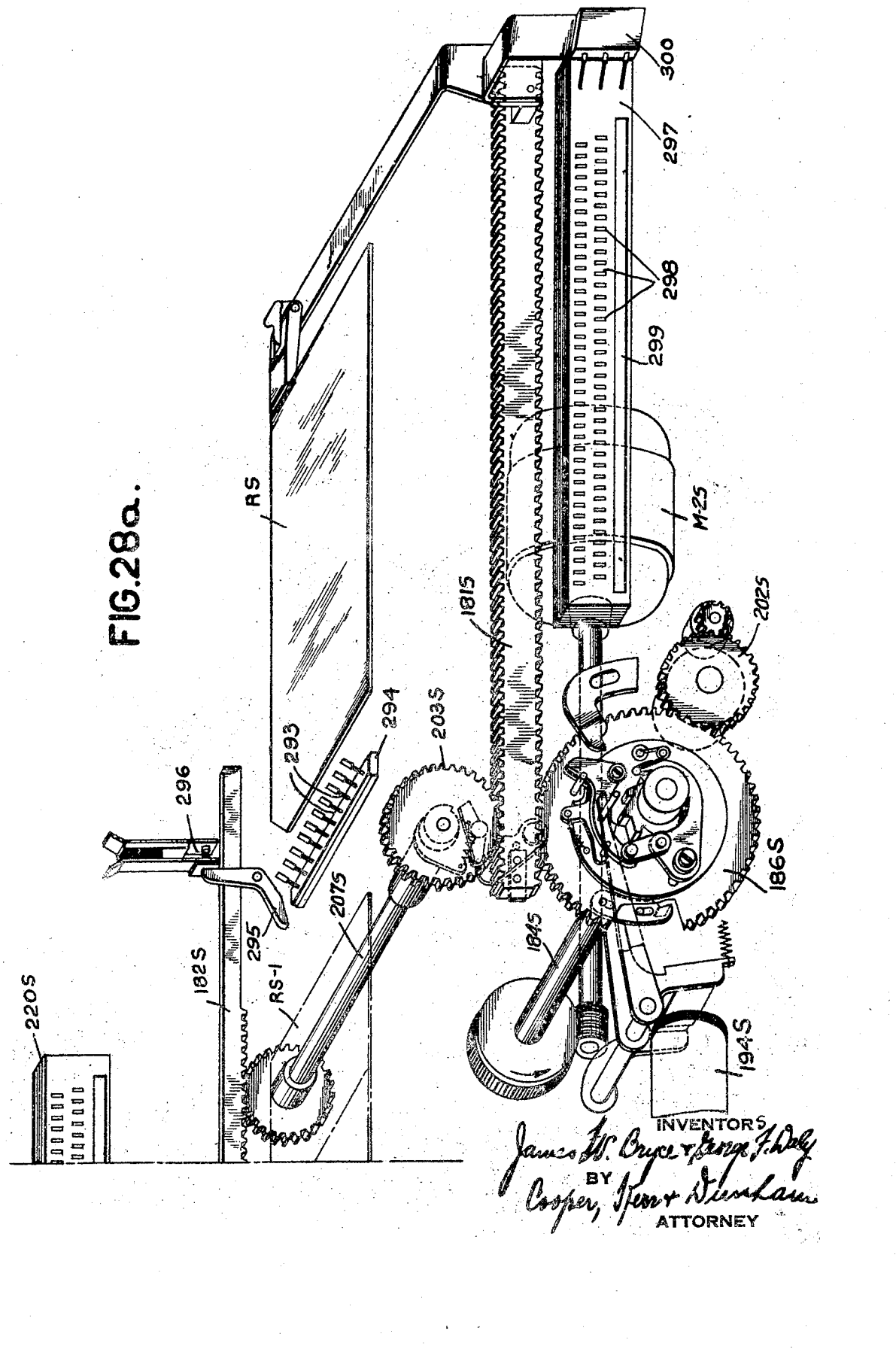

Nov. 24, 1936.  J. W. BRYCE ET AL  2,062,118
ACCOUNTING MACHINE WITH SUPPLEMENTAL RECORDER
Filed July 19, 1932  21 Sheets-Sheet 14
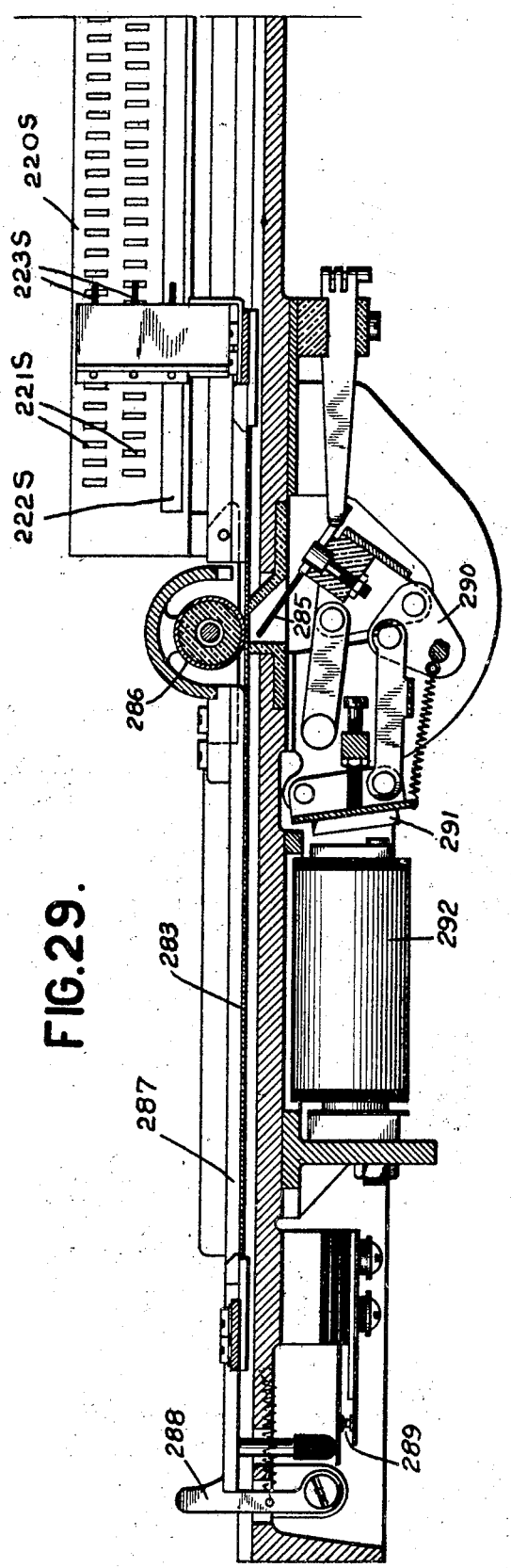

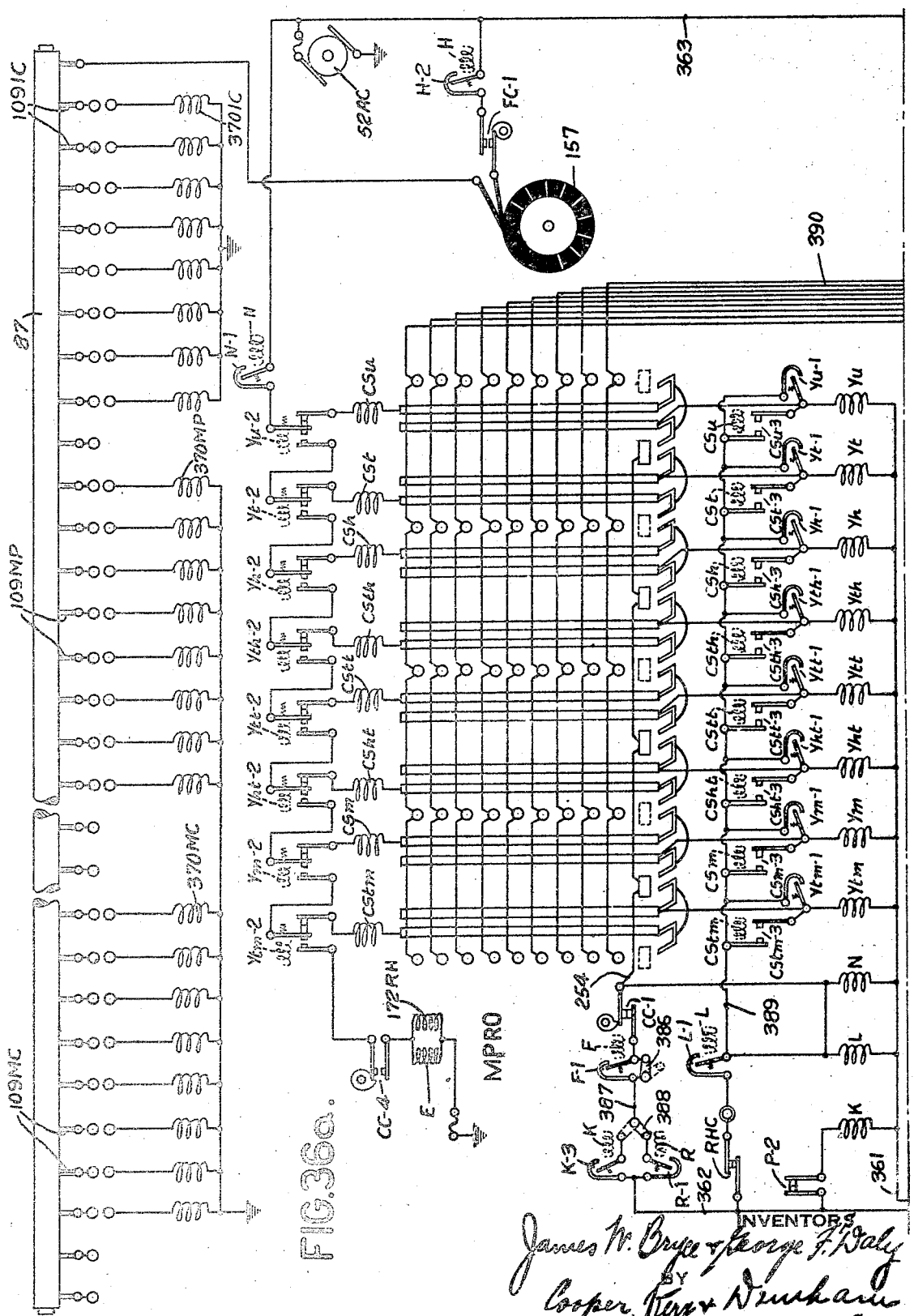

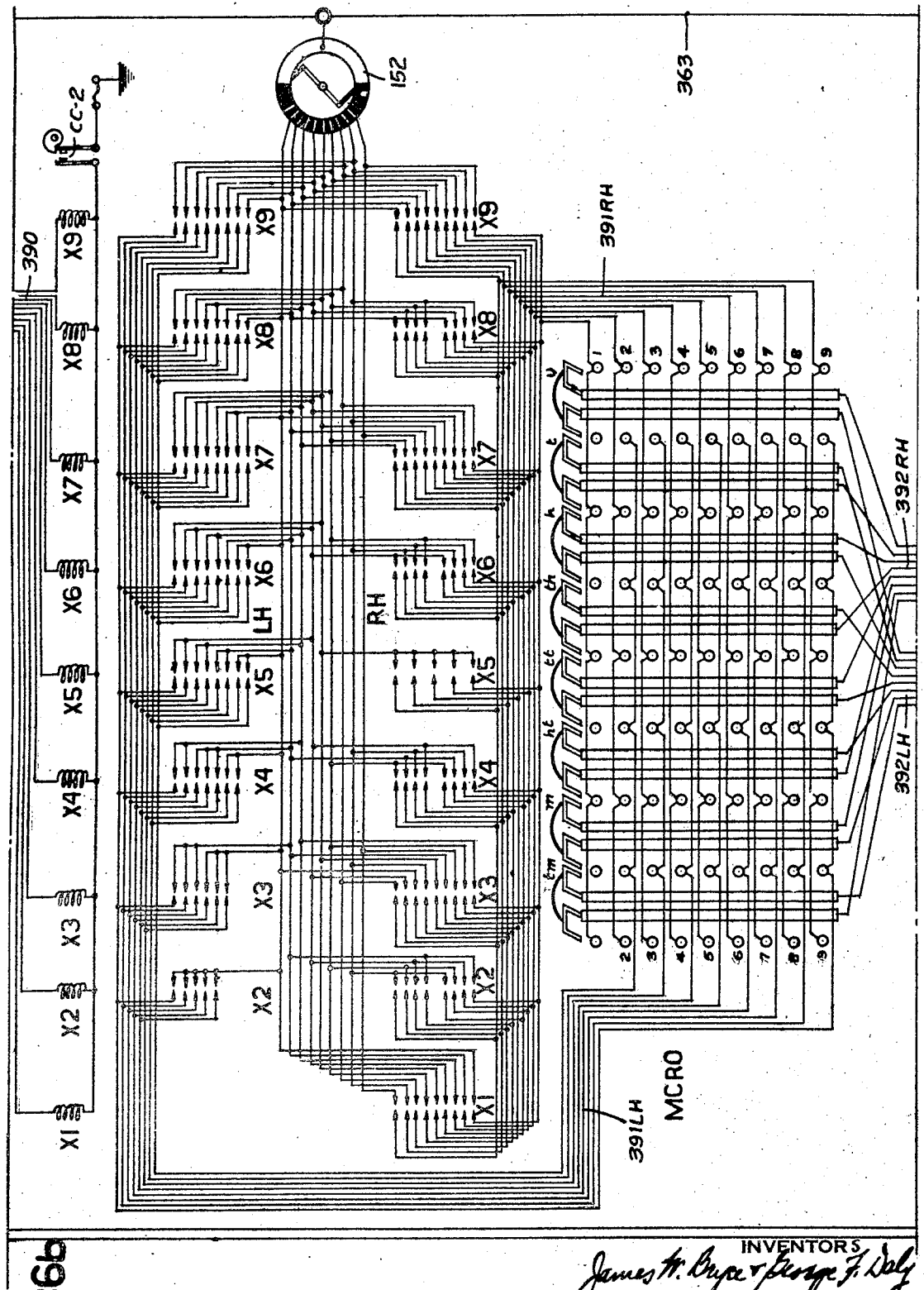

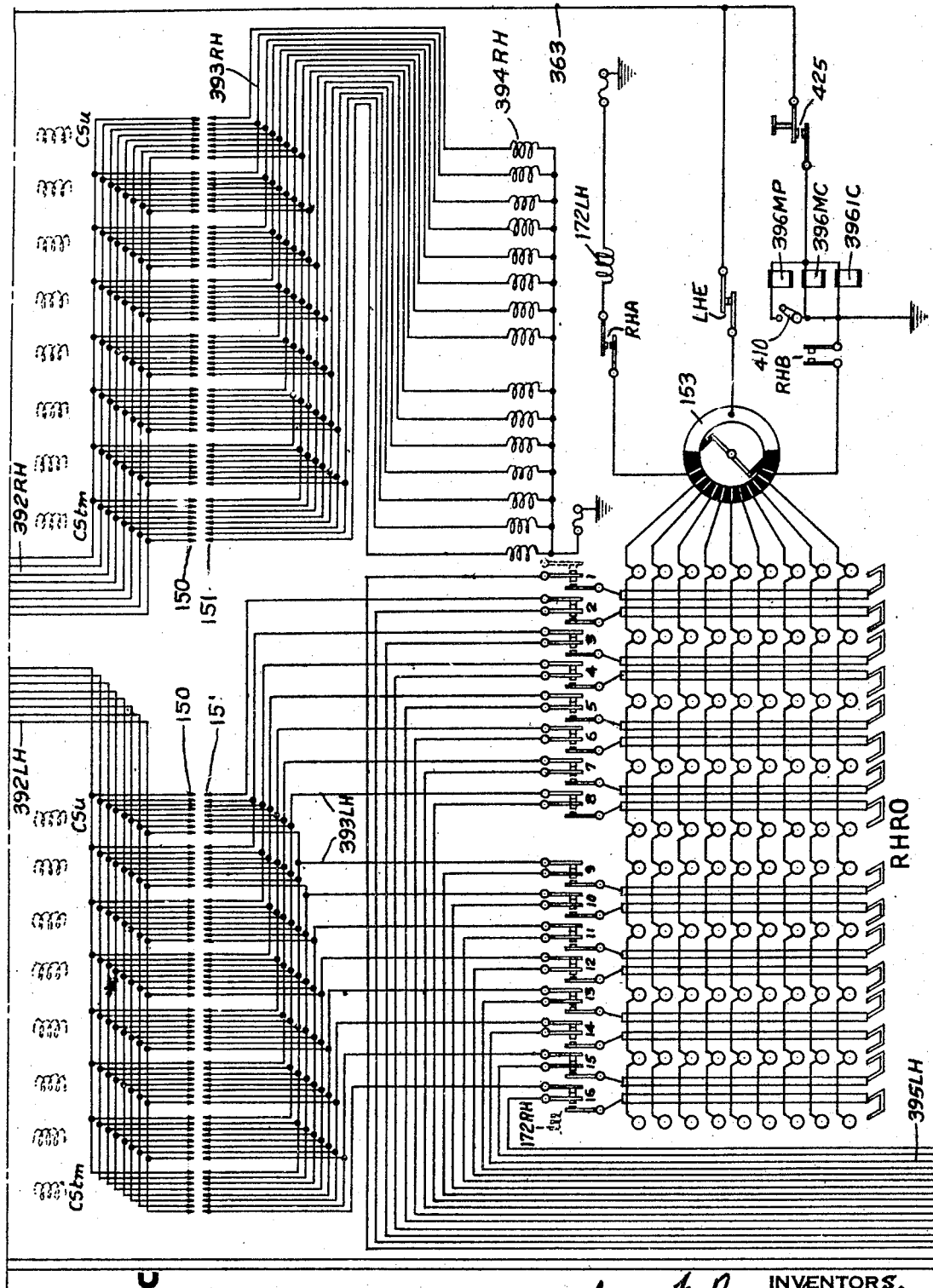

Nov. 24, 1936.  J. W. BRYCE ET AL  2,062,118
ACCOUNTING MACHINE WITH SUPPLEMENTAL RECORDER
Filed July 19, 1932  21 Sheets-Sheet 19

INVENTORS
James W. Bryce + George F. Daly
BY
Cooper, Kerr, Dunham
ATTORNEYS

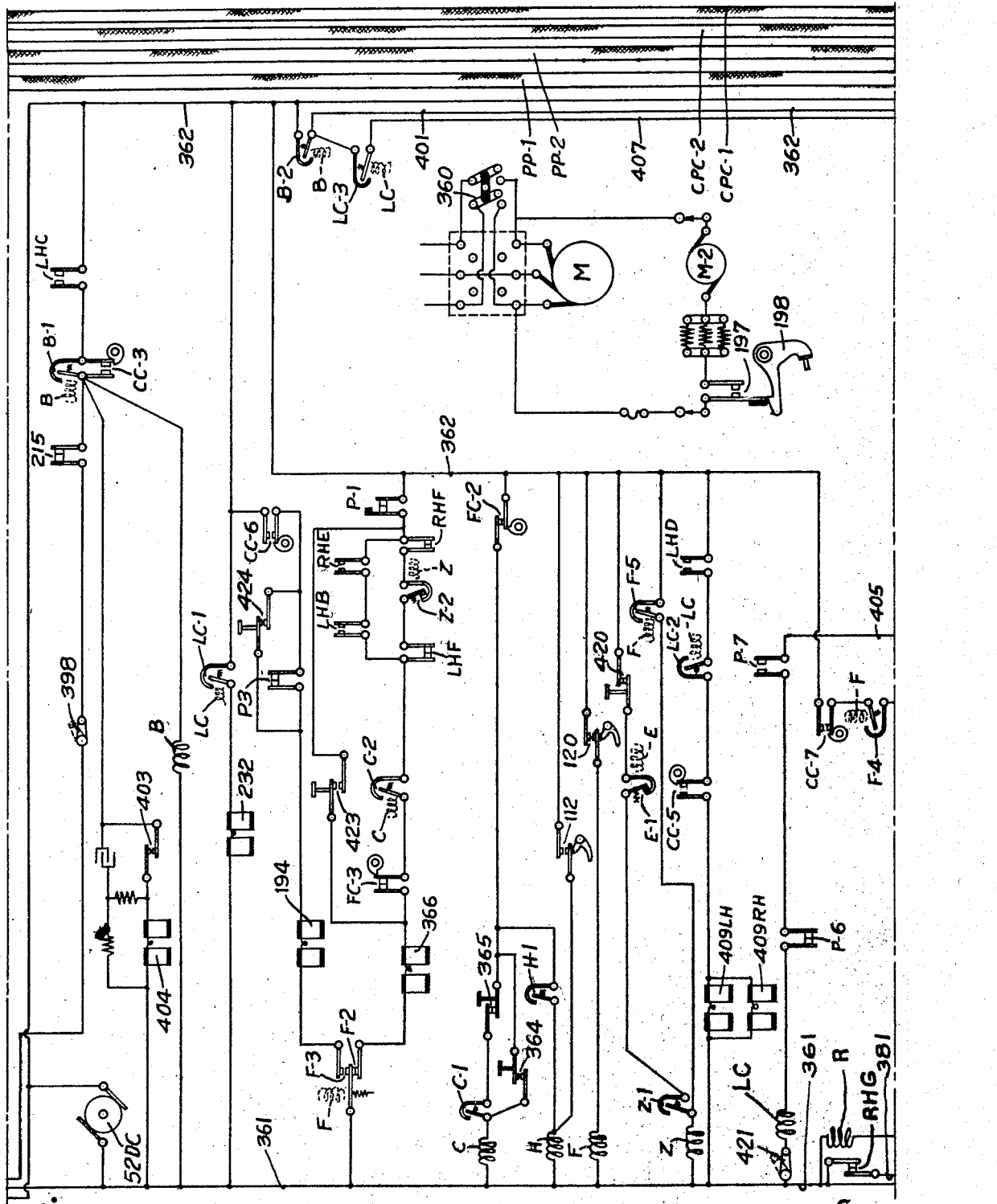

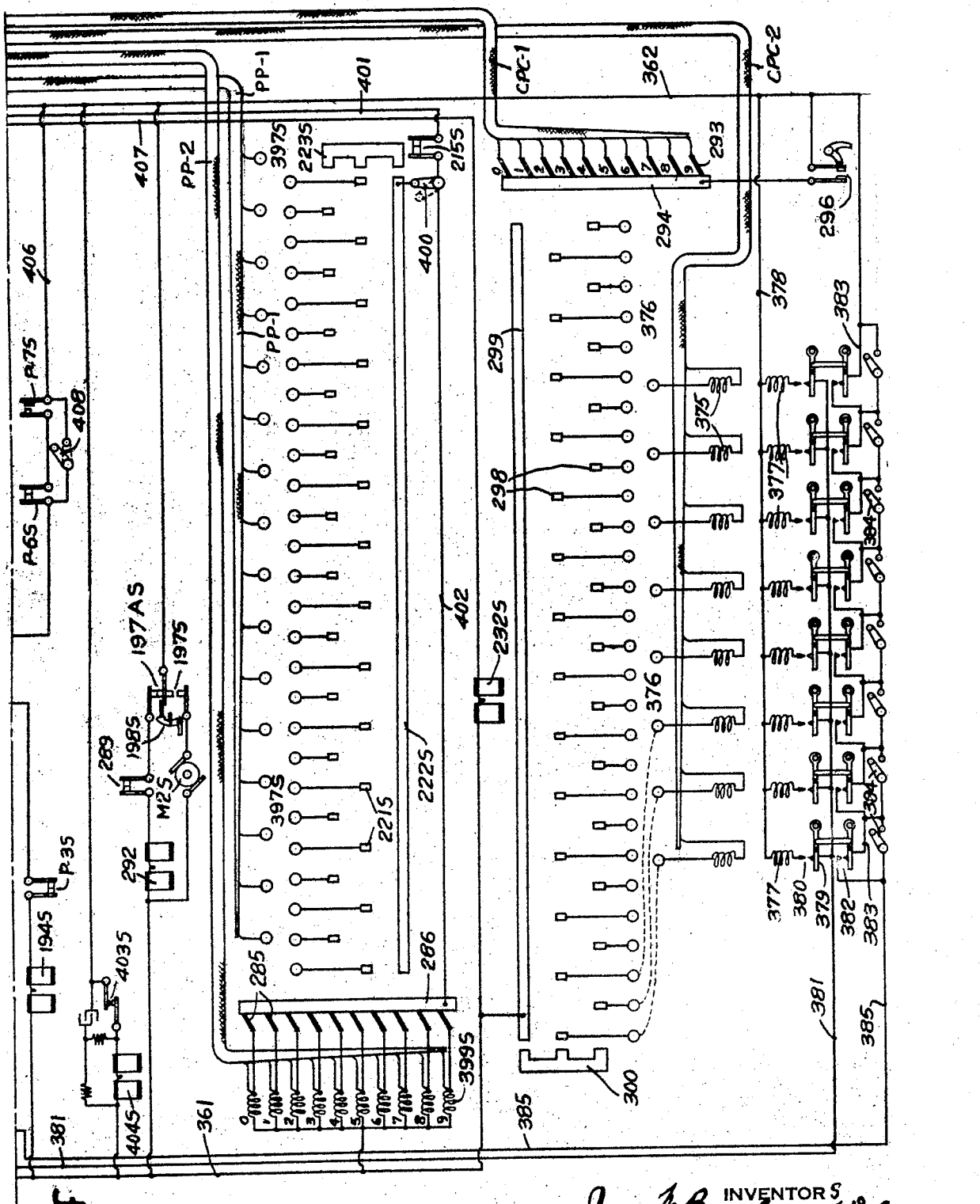

Patented Nov. 24, 1936

2,062,118

UNITED STATES PATENT OFFICE 2,062,118

ACCOUNTING MACHINE WITH SUPPLEMENTAL RECORDER

James W. Bryce, Bloomfield, N. J., and George F. Daly, Johnson City, N. Y., assignors, by mesne assignments, to International Business Machines Corporation, New York, N. Y., a corporation of New York Application July 19, 1932, Serial No. 623,354

27 Claims. (Cl. 235—92)

In previous record controlled and record making accounting machines, provision has been made for reading data from record cards and computing the data and then recording back upon the record cards the result of the computation. In certain accounting operations it is desirable not only to perform the computing operations under record card control, but it is also desired to produce another and distinct file of cards and provide in the cards the computed results as a result of the operation of the machine. In certain cases it is desirable that the computed result be placed upon the new file and not upon the original file of cards containing the factor data. In other cases it is desirable that the computed data be placed on both files of cards.

In these accounting operations it is obviously important that the computed data placed on the separate file of cards should properly match other data appearing thereon. For example, assume that computations are being effected involving the matter of shareholders' dividends. The first file of cards would contain the stockholder's number and the number of shares owned by that stockholder. The second file of cards would contain the stockholder's number and possibly the number of shares. Then in the operation of the machines, it is desired to extend on the second file of cards the amount of the dividend due to a particular stockholder. Such second file of cards could then be used for dividend check purposes. It is obvious that with such an operation, it is important that the proper computation be extended on the proper and corresponding check card.

In making such checks in certain cases, it is also desirable that additional repetition data such as the number of the dividend, the date of the dividend, etc. be extended on each of the check cards.

In handling separate sets of cards to insure that the computations be properly extended, provision should be made for comparing a control number on one set of cards and the control number on the other set of cards for example and if the stockholder's number, might be compared and if the comparison is correct, the amount of the stockholder's dividend should be extended on the second set of cards.

It will be appreciated that if a check card was out of the file that unless such comparison was made that incorrect and misplaced extensions would result.

The present invention has for its objects the provision of the arrangements of the machine adapted to perform operations of this general character.

Further objects of the present invention is to provide a combination of machines which will enable the above operations to be automatically performed with great rapidity after the machines have been loaded with cards and the operation initiated.

A further object of the present invention resides in the provision in the combination of machines in which comparison of readings of card pairs may be made and in which in the event that there is a comparison, a multiplying operation in one machine might be initiated.

A further object of the present invention resides in the provision of a set of conjointly controlled machines wherein after a comparison of a pair of cards is made, recording operations may be performed on either of the cards or both.

In the drawings:

Figure 1 shows a perspective view of the multiplying machine with its associated punching mechanism and also shows the supplemental punching mechanism which is electrically connected to the multiplying machine, but physically separate therefrom;

Figs. 2 and 2a taken together show a diagrammatic view of various units of the multiplying punch section of the machine and these views also show the driving train for the various parts in this multiplying section;

Fig. 3 is a vertical sectional view taken through the card handling and reading section of the multiplying punch;

Figs. 4 and 4a taken together shown a somewhat diagrammatic view of the punching section of the multiplying machine;

Fig. 5 is a sectional detail view of certain parts used in the punching section of the multiplying punch;

Fig. 6 is a detail of certain parts in the multiplying punch;

Fig. 7 is a side elevational view of one of the electromagnetic multi-contact relay devices which are used in the machine for column shift and multiplier selection purposes;

Fig. 8 is a sectional view taken substantially on line 8—8 of Fig. 7. This view shows the parts in the armature restoring and knockoff positions;

Figs. 9, 10, 11 and 12 show positional views of various parts of the multi-contact relay devices and show the relay contacts, the armature latch, etc., in various displaced positions;

Fig. 13 is a side elevational view of the operating cam and driving devices for effecting shifting of parts of the multi-contact relay devices. The view is in part a section taken on line 13—13 of Fig. 7;

Fig. 14 shows an isometric view of certain electro-mechanical or relay contacts which are disposed in the RH accumulator of the machine;

Fig. 15 shows similar contacts in the LH accumulator;

Fig. 16 shows somewhat diagrammatically the arrangement of the MP readout device and the driving train to the clutches;

Fig. 17 is a top plan view of the MP readout device completely wired;

Fig. 18 is a detail sectional view taken substantially on line 18—18 of Fig. 17;

Fig. 19 is a view similar to Fig. 16 but showing the MC and LH readout device;

Fig. 20 is a top plan wired view of the MC readout;

Fig. 21 is a view similar to Fig. 20 but showing only a fragment of the LH readout, in which there are ten segment spots in lieu of nine which are provided in the MC readout of Fig. 20;

Fig. 22 is a sectional view taken substantially on line 22—22 of Fig. 20;

Fig. 23 is a diagrammatic view similar to Fig. 16 but showing the drive for the IC readout and the RH readout;

Fig. 24 is a top plan view of the RH readout device and Fig. 25 is a fragmentary top plan view showing a portion of the IC readout. This readout has ten segment spots instead of nine as in the RH readout of Fig. 24;

Fig. 26 is a sectional view taken on line 26—26 of Fig. 24;

Fig. 27 is a top plan view of the supplemental punching mechanism which is shown in the perspective view Fig. 1;

Figure 30:
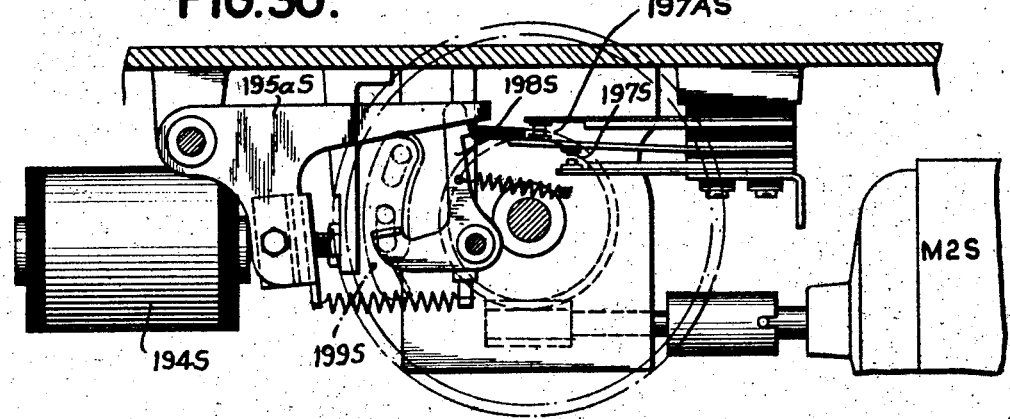

Figs. 28 and 28a taken together are diagrammatic views similar to Figs. 4 and 4a, but showing the mechanism of the supplemental punch including the master card reading mechanism;

Fig. 29 is a detail sectional view of certain parts in the master card reading section of the supplemental punch, the section being taken substantially on line 29—29 of Fig. 27. This view shows the devices for shifting the brushes into cooperating contact with the master card and also certain control contacts;

Fig. 30 is a view similar to Fig. 5 but showing corresponding parts in the supplemental punch and certain controlling contacts which are differently arranged than those shown in Fig. 5;

Figs. 31 to 35 inclusive show various skip bars which are used in the punch section of the multiplying punch and in the supplemental punch; and Figs. 36a, 36b, 36c, 36d, 36e and 36f, taken together and arranged vertically in the order named, show the complete circuit diagram of the machine.

Before describing the detailed arrangement of the various parts, a general description will be given of the various units. The complete machine essentially comprises two units which are physically separated as shown in Fig. 1. One unit is the multiplying punch proper which unit includes a card handling mechanism for reading data from the cards which are advanced therethrough one by one and for thereafter presenting the cards to the punching section of the multiplying machine. This unit will hereinafter be termed the "multiplying punch". The other section or unit of the machine, which is physically separate from the multiplying punch, is a supplemental punch which is electrically connected to the multiplying punch by a cable for certain comparison reading and control purposes. The supplemental punch includes devices for taking cards one by one from a magazine, passing them through a reading station and then through a punching section and delivering the same into a discharge magazine. The supplemental punch also includes a master card reading section so that readings can be derived from a master card when desired.

Before further describing the details of the units, it may be explained that one typical operation which the combination of machines are adapted to perform, is to read data from a main card into the multiplying punch and to compare certain of this read in data with other data derived from a supplemental card which passes through the supplemental punch. If certain data on these two cards compare, the machine continues in operation, the multiplying punch effecting its multiplying computation and subsequently the resulting product is punched back upon the card in the supplemental punch. Provision is also made for punching this product data on the main card which passes through the multiplying punch.

Other modifications of this general operation are capable of being performed by the pair of machines as will be more fully set forth in connection with the description of the circuit diagram.

Multiplying punch

The multiplying punch embodies a card feed and card handling section which is in the upper right hand corner of Fig. 2a and also shown in cross-section in Fig. 3. This part of the machine is arranged to feed cards and derive readings therefrom and afterwards pass the cards into the punching section of the multiplying punch. The punch in this punching section is a punch of the successive column punching type. The punch is shown somewhat diagrammatically in Figs. 4 and 4a.

The counters and receiving devices of the multiplying punch are as follows. In the upper part of the machine there is shown an LH and an RH accumulator which accumulators are so designated on Figs. 2 and 2a. In the lower part of the machine there are counters respectively designated MC and MP (see Fig. 2) which are used as multiplicand and multiplier entry receiving devices. In the lower part of the machine there is also shown another counter designated IC signifying indicating counter. This counter is an entry receiving device for receiving an amount such as a control number which is to be compared with a control number reading derived from a supplemental card passing through the supplemental punch.

The multiplying machine also includes a multiplying panel relay unit in the lower part of the machine designated MPR in Fig. 2. In the lower part of the machine there is also provided a column shift unit generally designated CS. In the present embodiment the column shift unit is of the multi-point mechanically controlled relay type. The multiplying punch also includes a number of emitter mechanisms and cam contact devices.

Machine drive

The multiplying punch is adapted to be driven by a constantly running motor M (Fig. 2a). This motor through a belt and pulley and ratchet drive 49, drives a shaft 51 (Fig. 2), which shaft drives an A. C. D. C. generator 52. The A. C. end of this generator produces the impulses for actuating various counters and certain of the relay magnets of the machine and this generator 52 has a D. C. (direct current) take-off section.

Shaft 51 through worm gear drive 53 drives a vertical shaft 54 which shaft drives the units in the upper section of the machine and the units in the lower section. Shaft 54 at its upper end, through worm gearing 55, is adapted to drive the counter drive shaft 56. The various counters are driven from this drive shaft in the customary manner. The reset drive is as follows. Shaft 53 is provided with a spur gear 57 driving a gear 58. Gear 58 has extending from it four Geneva pins 59 cooperating with the other or cross element 60 of the Geneva. Secured to part 60 is an internal gear 61 which meshes with a spur gear 62 fixed on the end of reset shaft 63. The Geneva cross element 60 also has a shaft 64 which extends to another internal gear 61a similar to gear 61 and having cooperating with it a spur gear 62a similar to gear 62 which gear 62a drives the reset shaft 63a for the RH accumulator unit.

The drives for the units in the lower part of the machine are substantially the same as previously described and the description for these drives need not be repeated. Similar parts in the lower section of the machine will be given corresponding reference numerals with the suffix b, such parts being 55b, 56b, 57b, 58b, 59b, 60b, 61b, 62b, and 63b. The lower drive shaft 56b also extends to the right (see Fig. 2a) and drives an operating cam 65 which cam through a follower 66 is adapted to actuate a cross sleeve 67 and operate certain shifting mechanism for the multiplier selector relay unit contact assemblages. A similar cam 65b is also provided driven from shaft 56b, which through a follower 66b is adapted to actuate a cross sleeve 67b and operate the shifting mechanism for the column shift relay units of the machine.

*Card feed and card handling unit drive*

Referring to Fig. 2a, the shaft 56 at its extreme right hand end is provided with a gear 68, which through gearing 69, 70, 71 and 72, drives a gear 73 revolubly mounted on shaft 75. Gear 73 has fixed to it one element 76 of a one revolution clutch, the complemental part of which comprises a pawl 77 carried by an arm 78 which is fixed to shaft 75. This one revolution feed clutch is engaged by the energization of a magnet 366. With the one revolution clutch engaged, shaft 75 will rotate in unison with gear 73 and with the clutch disengaged, 73 will continue to rotate and shaft 75 will remain stationary. Gear 73, through gearing 79, 80 and 81 drives card feed rolls 82 of the machine. These feed rolls 82 rotate at all times when gear 73 is rotating. In train with gear 79 is a gear 83 adapted to drive a drag roll shaft 84 provided with drag rolls 85. The shaft 75 has secured to it a gear 86 and has also secured to it a card transfer and contact cylinder 87. The one revolution clutch element 76 is provided with two notches and arrangement of the clutch is such that whenever the pawl 77 is engaged, the element 76 of the clutch will make one complete revolution. Accordingly, whenever the clutch is engaged, the card transfer cylinder will make one complete revolution. The one revolution clutch pawl 77 can be engaged in either of the two notches of the clutch element 76. This relation of the clutch parts is provided because one counter cycle is required to traverse the cards past the sensing brushes which cooperate with the transfer and contact cylinder 87 and another counter cycle is required to deliver the card to the punching section of the multiplying punch.

*Drive to intermittently actuated contacts and feed rolls*

Gear 86 through gearing 90, 91 and 92 drives the cams for actuating the FC group of cam contacts. Such cams make one revolution per card feed cycle in contradistinction to a counter cycle. Fixed to the shaft of gear 90 are card feed rolls 94 which are spring pressed into contact with cylinder 87. Similar spring pressed rolls 95 are provided driven by a gear 96 in train with gear 86. Rolls 94 and 95 are preferably made of insulating material.

*Card picker drive*

Shaft 75 has secured to it a box cam 97. The cam follower 98 connects to a rock shaft 102 provided with gear sectors 103. Such sectors engage the picker blocks 104 (see Fig. 3). By the engagement of the one revolution clutch the picker is called into action and such picker withdraws a single card from the magazine 105 (Fig. 3) and advances the card into the bite of rolls 82. Rolls 82 in turn forward the card to the card transfer roll 87. A curved card guide is provided around the transfer cylinder and the advancing card is carried around by the forward rotation of the transfer cylinder and by the rotation of rolls 94 so as to be traversed under the main card sensing brushes generally designated 109 in Fig. 3. Also in cooperation with the card is a pivoted card lever 111 having a tail portion adapted to press against the upper surface of the card. With the card under this tail portion the card lever contacts 112 will be closed.

After the card is sensed by brushes 109 it is advanced by rolls 95 and cylinder 87 between guides 114 and 115. While between these guides the card is advanced by drag rolls 85 which extend downwardly into recesses of the lower members 114 as shown in Fig. 2a. Such drag rolls advance the card after it has been released by rolls 95 and deliver the card into the tray of the punching section of the machine under a guide member 117. The card is flipped down into the tray of the punching section of the machine. The location of the tray is generally indicated at R (Fig. 2a). A card lever 119 is also provided adjacent this point, which card lever is arranged to close card lever contacts 120 when a card is lodged in the tray of the punch.

As the card is traversed past the sensing brushes the amount of the multiplier and the multiplicand and the extra control or classification number amount will be read from the card and entered into the MP receiving device, the MC receiving device and the IC counter. The various receiving devices designated MP, MC, IC and the LH and RH accumulators are of the usual type as customarily used in tabulating machines and are provided with electro-mechanically actuated clutches. Such entry devices and accumulators are provided with readout devices to be hereinafter described.

*Multiplying panel and column shift relays*

The multi-contact relays used for controlling multiplication and effecting column shift are of the conventional type used in machines of this class. Each plate relay comprises a mounting plate 130 slidably supported in slotted frame plates of the machine. On each plate is a magnet designated CS when the relay is used for column shift purposes and X—1, X—2, X—3, etc. when the relay is to be used for multiplier selection purposes. Such magnets when energized, release the relay parts for subsequent closure of the contacts. Followers 66 and 66b previously referred to each have secured thereto an arm 131 which cooperates with a serrated operating bar 132. Such serrated operating bars are slidably mounted and disposed below and at one side of the base of the controlling relay section of the machine. Arms 133 of a contact operating bail structure extend into the serrations of such bar 132. Each arm 133 is fixed to a rock shaft 134. Secured at opposite ends of shaft 134 are upstanding arms 135 and 136. Arm 135 is also fixed to arm 133 and connecting the arms 135 and 136 is a cross member 137 which carries a bail of insulating material 138. Arm 136 extends upwardly beyond 137, such extension being designated 136a. The relay magnet CS or X has a pivotally mounted armature 139 spring retracted by a spring 140. Armature 139 also has an upstanding portion 141 (see Fig. 8) which portion is in alignment with the screw 142 carried by the bent over portion 143 of arm 136a.

Referring to Fig. 8, with the serrated operating bar 132 in the position shown, arm 133 will be rocked in a clockwise direction swinging 136a clockwise and causing 142 to abut against 141 and restore and knock off any previously attracted armature. Each armature 139 is provided with a latch portion 144 and pivotally supported on 136a upon the stud 145 is a forked member 146. The forked member 146 (see Fig. 7) is disposed to the left of 136a and the forks of this member 146 are turned over and pass the sides of 136a. One forked portion, designated 147, cooperates with the latch point 144 on armature 139. The other fork 148 is disposed on the opposite side of 136a (see Fig. 8). A spring 149 is staked at one end to 146 and also staked to the arm 136a and tends to rock the forked member 146 anti-clockwise with respect to 136a. After the armature has been restored as indicated in Fig. 8, the serrated operating bar 132 by its cam action is shifted slightly to the right. Such action allows arms 133 to follow the operating bar by the spring pressure of contact blades 150. This slight movement of 133 to the right swings 136a slightly to the left to a position in which there is still clearance between 147 and 136a (see Fig. 9). With the parts in this position the spring strain of contacts 150 is removed from the latch point 144. The latch may now be released by energization of the magnet. Thereupon the action of spring 149 causes 147 to snap over the top of the latch point 144 to the position shown in Fig. 10. The next action is the actual closing of contacts 150 with 151 (see Fig. 11). Such action occurs upon the further shifting of the operating bar 132. 133 swings to its extreme anticlockwise position under the action of spring contacts 150. The insulating bail then moves to the left and allows contacts 150 and 151 to close.

The further operation comprises the knocking off of the armature as shown in Fig. 8 and previously described. This armature knocking off action positively opens up contacts 150 and 151.

Fig. 12 shows the relation of parts upon an operation when no armature has been tripped. In this event the latching nose 144 cooperates with the forked arm 147 and prevents 136a from swinging to the left beyond the latching point.

Emitter and CC cams

The machine includes a number of emitters of conventional construction, an impulse distributor and a number of CC cam contact devices. The emitters are shown in Fig. 2 at 152 and 153 and are driven from the main counter drive shaft 56 in the conventional manner. The cams for operating the CC group of cam contacts are also driven from the counter drive shaft and are designated CC—1 through 7, corresponding to the showing in the circuit diagram. The impulse distributor is shown at 157.

Electro-mechanical relays in the RH and LH accumulators

Fig. 14 shows the contact devices in the RH accumulator. This electro-mechanical relay comprises sixteen three-blade contacts designated RH—1 to 16 inclusive. There are also normally closed two-blade contacts RHC, RHF and RHG and normally open two-blade contacts RHA, RHB and RHE.

The above various RH contacts are arranged to shift to reverse position by energization of magnet 172RH, which when energized trips armature 170, releasing 171 and allowing bail shaft 172 to rock under the influence of spring 173. The bail 174 upon moving allows the contacts to shift. Restoration of the RH contacts and re-latching of 171 with 170 is effected by a lever 175 fixed to the bail shaft which cooperates with a lever 176 having its opposite end cooperating with the cam 177 upon a reset gear 178 of the RH accumulator.

The LH accumulator is provided with contacts which are similarly operated. The normally closed contacts are LHE and LHF and the normally open contacts are LHC, LHB and LHD. Such contacts are released by a magnet 172LH similar to 172RH. The restoring parts are of the same construction as for the RH contacts and are operated from a cam fixed to the LH accumulator reset gear.

Punching mechanism

The punching mechanism is of the customary successive column actuating repetition punching type as generally used in machines of this class. It is generally of the form shown in Lee and Phillips United States Patent No. 1,772,186 and in British Patent No. 362,529 corresponding to the United States application to Lee and Daly, Serial No. 391,874.

The punching mechanism of the multiplying punch includes two card feed racks 181 and 182. 182 carries an arm provided with pusher fingers 183. The drive is by a separate motor M—2, which through the driving train shown drives shaft 184 which has a ratchet shaped clutch element 185 fixed on one end of it. Alongside of 185 is a gear 186 which meshes with the lower teeth of 181. Secured to 186 is a disk 187. Pivoted on 187 is a member 188 provided with a ratchet shaped clutch tooth 189. Alongside of 188 is another member 188b which lacks the clutch tooth. On 188 is a pin 188c overlying an arcuate surface of 188b. The free end of 188b is connected to a toggle member 190 by a link 191. 190 is pivoted on 187 at 192. The opposite end of 190, remote from its pivot 192 is connected to a spring element 193 which spring tends to hold the clutch tooth 189 out of engagement with the clutch teeth of element 185 and allows it to engage when 190 is shifted. For the purpose of effecting a clutching action a punch feed clutch magnet 194 is provided. This magnet when energized attracts its armature and causes an arm 195 to engage a pin 196 (see Fig. 4a, in which figure the extension of this arm 195 is shown broken off for clarity of illustration of the other parts), depressing 188b and allowing 188 to descend so that the tooth 189 engages with the ratchet 185. Upon such engagement the gear 186 will be driven in counterclockwise direction substantially a single revolution, shifting rack 181 to the left. This action will, through the card pusher shown in Fig. 4a, move the card from the R position to the R—1 position. Also when magnet 194 is energized, an arm 195a on the armature will close contacts 197. Such contacts are latched closed by a latch 198. The latch 198 is tripped to allow the contacts to reopen by a knockoff 199 carried on the back of gear 186 (see Fig. 4a). At the termination of the counterclockwise movement of gear 186 the tails 200 of parts 188 and 188b will strike a projection 201 on a fixed plate to effect the disengagement of the tooth 189 from the ratchet 185. This action also restores the toggle parts to normal position.

The above driving action has wound up a spring in barrel 202. Upon disengagement of the one revolution clutch tooth 189, rack 181 returns to the right under the influence of the spring in barrel 202.

The driving train to the second card carriage rack 182 is as follows. Rack 181 has its upper teeth intermeshed with gear 203, which has secured to it a member 204 (see also Fig. 6) having a single notch or tooth disposed in the plane of a pawl 205 which is pivoted on part 206 fixed to the shaft 207. 207 on its opposite end carries a gear 208 which meshes with card carriage rack 182. Suitable mechanism shown in Fig. 6 controls the co-action of pawl 205 with member 204 so that with the rack 181 in extreme right hand position pawl 205 will be disengaged from the clutch element 204. Such disengagement is effected by the rocking of 209 in a clockwise direction by the coaction of the pin 210 with a block 211 carried on rack 181. Upon initial movement of 181 to the left the block 211 will clear the pivoted camming element 209 allowing a slight counterclockwise motion of it so that 205 under spring action may rock and engage the tooth of member 204. Thereafter drive will come from 181 through gear 203, through 204, to pawl 205, to 206, to shaft 207 so that a clockwise rotational movement will be imparted to 207. This action will, through gear 208, traverse rack 182 to the right. The card carriage rack 182 will thus be shifted to extreme right hand position permitting the card pushers 183 (Fig. 4) to first ride over the surface of the card and ultimately engage back of the trailing edge of the card at the R—1 position. Rack 182 has associated with it a spring drive comprising the usual spring barrel 212. This spring is wound up by the traverse of 182 to the right and is adapted to cause a movement of 182 to the left under spring action. The rack 182 also has associated with it an escapement mechanism 213 having a dog 214. This escapement is more fully described in Schaaff United States Patent No. 1,426,223 and in Lee and Phillips Patent No. 1,772,186. The usual controlling contacts 215 customarily in machines of this class are also provided cooperating with the escapement parts.

Removably secured to the card carriage rack 182 is a skip bar 216 provided with a notched portion 217 which permits skip lifter lever 218 to descend when in the notch or to remain elevated when riding on the high part of the skip bar. When the skip lifter lever descends into the notch it allows the dog 214 of the escapement mechanism to cooperate with the ratchet teeth of rack 182. With skip lifter lever 218 riding on the top of the skip bar 216 the escapement will be disabled so that the card carriage rack 182 can traverse without stopping at each card column until the notch 217 is reached. Thereafter there is an intermittent motion of the card carriage to the left under spring action and under escapement control. When the skip lifter lever again rides out of the notch the card carriage rack 182 takes its full excursion to the left. The location of the beginning of the notch in the skip lifter lever bar determines the position for the beginning of result or other punching. When the escapement dog is lifted up the contacts 215 are open as is customary in machines of this class. It may be explained that various forms of skip bars can be placed in the machine depending upon the class of work which is to be performed. Such skip bars will be subsequently more fully set forth. The punching mechanism proper need not be fully described as it is set forth in the Lee and Phillips patent above referred to and in British Patent No. 362,529. In brief it comprises a set of punches 219, which punches are adapted to be depressed to perforate the card through interposers not shown, but which are under the control of punching selector magnets.

Referring to Fig. 4 there is shown disposed alongside of the card carriage rack 182 and fixed to the frame of the machine a block or strip of insulating material 220. Disposed in this block are a number of spots 221 of conducting material and alongside of these spots is a common strip of conducting material 222. A suitable bridging piece or multiple brush assembly 223 is carried by the card carriage rack 182 and as this card carriage rack moves the bridging brush 223 is displaced and establishes circuit connections from the common bar 222 to one of the spots 221 depending upon the columnar position of the card carriage rack 182. Spots 221 are preferably placed in two rows and inter-staggered as shown. This structure will be hereinafter termed "a reading strip".

Card ejector

Referring to Fig. 4, after the card has reached the R—1 position and has been traversed past the punches and has been punched or traversed past the punches without punching, it ultimately reaches a position at the extreme left hand of the punching section of the machine from which point it must be discharged into the discharge hopper. The card eject mechanism is shown in Fig. 4 with the parts shown in the position which they assumed before the machine was started into operation. Upon the first card feeding operation through the punching section of the machine, rack 181 will have moved towards its extreme left position. After reaching the dotted line position shown in Fig. 4, 181 moves further to the left and thrusts a rack 224 to the left compressing coil spring 225. Bearing against a shoulder on rack 224 is a contact operating part 226. When 224 is thrust to the left, contacts P—3 which were previously closed will open under their own spring action. The thrusting of 224 to the left will also allow a member 240 to rock and allow contacts P—7 which were previously open to close. The displacement of rack 224 to the extreme left position will, through intermediate gears 227, rock a shaft 228 in a clockwise direction to bring an ejector clip assemblage 229 away from the position shown in Fig. 4 to a position in which the ejector clip can receive a card which has been advanced through the machine. With the ejector clip assemblage 229 disposed in such card receiving position the assemblage will be latched in such position by a latch 231, which latch is fully described in British Patent No. 362,529 (see latch 216 of that patent in Fig. 16). The ejector clip latch is adapted to be released by an ejector clip magnet 232. Upon energization of the eject magnet 232 latch 231 is released so that the ejector clip assemblage which has then grasped a card, swings from the card receiving position to the position shown in Fig. 4, in which position the jaws of the ejector are opened so that a card can be discharged therefrom.

Contact devices in the punching section of the multiplier punch

The contact devices P—3 and P—7 have been previously described. In the multiplier punch there are also contacts P—2 and P—6. Such contacts are operated as follows. An extension 233 on rack 182 is adapted, when rack 182 has passed beyond the last card column position, to allow contacts P—2 and P—6 which were previously open, to close. Such contacts P—2 and P—6 are normally open when rack 182 is in any of the positions to the right of the position beyond the last column position.

At the opposite end of the machine are contacts P—1 which are normally closed with the rack 181 in the position shown and such contacts automatically open upon the movement of 181 from the position shown. These contacts furthermore remain open during the complete traverse of 181 to the left and back to its starting position.

MP readout

Referring to Figs. 16 to 18 inclusive, 240 is a clutch gear pertaining to the units order of the MP receiving device. Gear 241 is driven from this clutch gear and this gear in turn drives two brush assemblages, one designated 242U, which traverses the segments 243 and also current supply segment 244. There is another brush 245U driven by gear 241 which traverses a segment generally designated 246, which segment is provided with a single conducting segment spot at the zero position. Brush 245U also traverses a common supply segment 247. There is a similar brush 245T which is positioned from the tens order clutch wheel 248 and which also traverses the segment 246 which contains only the single conducting spot at the zero position. Brush 245T also traverses a separate common current supply segment 249. Similarly there is a brush 242T driven in unison with brush 245T which traverses the segment spots 250, and which receives current from the common current supply segment 251. This arrangement of brushes and segments is repeated for higher orders in the MP readout device, i. e. each alternate segment 252 is like 246 with only a single spot in the zero position. Alternating with these segments are other segments similar to 243 and 250 with the multiplicity of spots on each segment.

Referring to Fig. 17, the 1 to 9 segment spots of the 243 and 250 segments and alternating segments of this type, skipping the intermediate segments of the zero spot type, are wired together by transverse bus connections 253. Likewise on the alternate segments such as 246, 252, etc., (which contain only zero spots) such segments are wired together by bus connections 254.

MC and LH readout

Referring now to Figs. 19 to 22 inclusive in Fig. 19, is shown a brush driving arrangement for the MC and LH readout devices. In these readout devices the units clutch gear train 256 drives a units brush 257U which cooperates with a set of segments 258 which receive current from a common conductor segment 259. Similarly the units driving train 256 drives a brush 260U receiving current from a common segment 261 and cooperating with segments 262. Also cooperating with segments 262 is another brush 260T receiving current from 263 and driven by the tens order train 264. This train 264 also drives a brush assemblage 257T which cooperates with the segments 265 and receives current from the segment 266. This arrangement thus described is repeated for relatively higher orders of these readout devices.

The above described arrangement is the arrangement for MCRO readout. On the LH readout zero spots 267, 268 and 269 are also provided.

Referring now to Fig. 20, this figure shows the cross wiring arrangement for the MC readout. The 1 to 9 spots of segment 258 are shown connected to the 1 to 9 spots of the 265 set and the 1 to 9 spots of the 262 set are shown connected to 1 to 9 spots of the 270 set skipping over the set of the spots to the left. These bus connection are respectively indicated by the wires generally designated 271 and 272. On the LH readout device the wiring is identical except that these readout devices are provided with ten segment spots instead of nine as used on the MC readout (see Fig. 21) which shows a top plan view of a part of such LH readout with ten spots, which, however, are not shown wired up.

RH and IC readouts

Referring now to Figs. 23 to 25 inclusive, Fig. 23 shows the general arrangement of drive for these readouts. With these readouts, segment spots 273 are common to two sets of brushes designated 274 and 275 respectively and which brushes respectively cooperate with the conducting segments 276 and 277. Brush 274 (see Fig. 23) is driven from the units order clutch gear 278. Brush 275 is driven from the tens order clutch gear 279. A similar arrangement of brushes and readout spots is provided for the relatively higher orders of the RH and IC readout devices. The various segments of the readout devices are transversely connected by transverse buses generally designated 280 on Fig. 24. The IC readout is substantially the same as previously described for the RH readout except that it is provided with ten sets of segment spots 273 instead of nine as in the case of the RH readout.

Supplemental punch

The supplemental punch in its general construction is substantially similar to the punch in the multiplying section which has been previously fully described. It, like the punch in the multiplying machine, is provided with the two racks similar to 181 and 182 which will be respectively designated 181S and 182S. The supplemental punch is driven by the driving motor M—2S and the driving train is identical to that previously described for the other punch and need not therefore be repeated.

In the supplemental punch, in lieu of taking single cards from an R position and then advancing such card through the punching section of the machine a card magazine is supplied at the R position. Such card magazine in the supplemental punch will be designated RS (see Fig. 27 and Fig. 28a), the reading strip and associated parts are 220S, 221S, 222S and 223S inclusive as before in the other punching unit, but are slightly re-located (see Fig. 28). Contacts P—3S corresponding to P—3 are provided and function similarly. Contacts P—7S corresponding to P—7 are also provided and function similarly.

In lieu of providing contacts similar to P—2 and P—6 as in the multiplying punch, a single set of contacts P—6S are provided, which contacts are normally open and which are closed when rack 182S passes beyond the last column position.

The supplemental punch is provided with a master card reading section which is of the customary type as used in duplicating punches. For fuller description of a duplicating punch with a master card tray, reference may be made to the copending applications of Fred Lee and George F. Daly, Serial No. 391,874, filed Sept. 11, 1921, and Serial No. 461,993 of George F. Daly, filed June 18, 1930. In brief the master card reading station comprises a pair of card carrying arms 281 and 282 arranged to receive a master card 283 therebetween as indicated in Fig. 28 and to traverse the card past a set of master card reading brushes 285. Brushes 285 cooperate with a contact roll 286. The contact roll 286 is carried upon a card gate member 287 which is pivotally mounted and arranged to be held down by a card gate latch 288. Upon the holding down of the card gate by the latch, contacts 289 are adapted to be closed.

It will be understood that the master card 283 will be displaced with respect to the brushes so that an amount perforated in such master card will be read upon the displacement of the rack 182S. As is customary in machines of this class (see Fig. 29) provision is made for keeping the brushes 285 in cooperation with the master card during the traverse of the master card 283 to the left and for lowering the brushes upon retrograde movement of the master card. For this purpose the brush assemblage is adapted to be raised by the mounting and linkage generally designated 290 which connects to an armature 291 of a brush raising magnet 292. Upon energization of 292, the brushes 285 are elevated up into contact with the card 283 and upon de-energization of the magnet, the brushes swing away from the card to permit retrograde movement of the master card 283 to the right without damaging the brushes.

Referring now to Fig. 30, which generally corresponds to Fig. 5, showing the other punching section, the arrangement and manner of operation of latch 198S is the same as the latch member 198 previously described. In lieu of providing simple make contacts 197S, double sets of contacts 197S and 197AS are provided. Such contacts 197AS are adapted to open upon the closure of 197S and are adapted to close upon the opening of 197S.

It has been explained before that provision is desired in the supplemental punch for reading amounts from a card as the same is withdrawn from the supply magazine RS. Such reading means preferably comprise a set of brushes 293 which cooperate with a common strip 294, the card passing between the brushes and the common strip. In addition a card lever 295 is provided adapted to close card lever contacts 296. The arrangement and relation of parts is such that the card lever contacts 296 close at a time when the card is traversing under brushes 293 and open up between cards. The supplemental punch is likewise provided with a supplemental reading strip. Such reading strip comprises a block of insulating material 297 which is fixed to the frame of the machine and provided with conducting segment spots 298, common strip 299 and provided with a multiple brush assemblage 300. The multiple brush assemblage is connected by a bracket to rack 181S.

It will be accordingly appreciated that in the supplemental punch that there are two reading strips. One reading strip being the one shown principally in Fig. 28 and being associated with rack 182S and the other reading strip being shown in Fig. 28a in the extreme lower right hand corner and being associated with the rack 181S.

*General operation*

When the combination of machines are to be used, cards of the main card file are placed in the card magazine of the multiplying machine and supplemental cards of the supplemental card file are also placed in the magazine of the supplemental punch. The "main" cards which are placed in the multiplying machine magazine will be prepunched to represent the amount of the multiplier, the amount of the multiplicand, and such cards may also bear additional perforations including a control number such as a serial number, account number or the like. The cards which are placed in the supplemental punch will be provided with perforations representing the control number, serial number, account number or the like and with other data if desired. A master card with suitable perforations in desired fields may be also placed in the master card tray of the supplemental punch. It will be understood that such master card feature need not be used unless desired.

Having loaded the machines with the sets of cards, the multiplying machine is set in operation in the usual manner to be more fully described hereinafter and as the multiplying machine operates the first "main" card is passed through this machine and ultimately reaches the receiving tray of the punching section of the machine. Enroute thereto the control number is read from the said card and entered into the IC counter. The multiplier and multiplicand factors are also read and entered into the MP and MC receiving devices. Upon the main card reaching the receiving tray of the multiplying punch, the supplemental punch unit is called into operation and the first supplemental card is withdrawn from its magazine and fed through the supplemental punch. As this supplemental card is fed, the control number is read therefrom. This reading of the control number from the supplemental card in the supplemental punch is effected column by column as the card feeds endwise through the supplemental punch. Provisions are made for comparing the control number which is thus read from the card in the supplemental punch with the control number set up on the IC counter and derived from the main card which was passed through the multiplying punch. If the control number of a supplemental card compares with the control number read from a related main card the multiplying machine is permitted to continue with its multiplying computation. Upon completion of the computation by the multiplying machine the amount of the product may be read out. Provision is made for reading out the amount of the product and punching such product amount upon the card in the supplemental punch. Also if desired, the product can be punched upon the card in the multiplying punch. Furthermore if desired the product can be punched upon the card in the multiplying punch and not punched upon the card in the supplemental punch. Thus if the control numbers compare there may be a punching in the supplemental card only, there may be a punching in the card in the multiplying punch only and there may be a punching from the card upon corresponding cards in both the multiplying punch and the supplemental punch.

In addition to the above product punching operations provision can be made for entering supplemental data upon the card in the supplemental punch under control of the master card in the supplemental punch.

In the present machine no provision is made for entering such master card data upon the card in the multiplying punch. The amounts derived from the master card can be entered either before or after the product punching in the supplemental card or amounts can be perforated both before and after the product punching as desired. After the separate punching operations have been completed both cards are ejected in the usual way, one card being ejected from the multiplying punch and the other card being ejected from the supplemental punch. The machine is then ready to proceed on a new card handling and comparing operation upon a new pair of cards and if there is a proper comparison and matching of the control numbers the machine proceeds automatically on a new computing operation, punching operation, etc. on such succeeding card or cards.

In brief the foregoing has described the general mode of operation and various supplemental and more detailed features will be hereinafter set forth in the description of the circuit diagram.

It will be understood that the arrangements of the machine are such that there is a conjoint control between machines, that is if data are to be punched on the supplemental card and operations are also to be performed on the main multiplying card, both operations must be completed before a new card handling and comparison operation can be initiated.

*Circuit diagram*

It will be assumed that properly prepunched cards have been placed in both machines and the machines are to be started up. To start up the multiplying machine switch 360 is closed, supplying current from the source to the driving motor M. This motor drives the A. C., D. C. generator 52 and supplies direct current to the D. C. buses 361 and 362 and alternating current impulses to the A. C. bus 363 (see Figs. 36a, 36b and 36c). The operator then depresses the start key 364 and relay coil C is energized through a circuit extending through cam contacts FC—2 now closed. Energization of relay coil C closes stick relay points C—1, the stick circuit being maintained through the stop key contacts 365 as long as contacts FC—2 are closed. To hold coil C energized upon the opening of contacts FC—2 supplemental circuits are provided as follows. A relay coil H is disposed in the card lever circuit through card lever contacts 112. Such card lever contacts 112 are closed at the time when contacts FC—2 open to provide a current path through coil C upon the opening of FC—2. Such holding circuit is through relay points H—1 which are closed upon the energization of coil H. The energization of coil C in the manner previously explained closes relay points C—2 and establishes a circuit through the feed clutch magnet 366 of the multiplying machine (see Fig. 2a), through a circuit path traced as follows. From the 361 side of the D. C. line through relay points F—2 now closed, through magnet 366, through cam contacts FC—3 now closed, through relay points C—2, through contacts LHF, relay points Z—2 now closed and which remain closed until after the card has passed the reading brushes, through contacts RHF now closed, through P—1 and to the other side of the D. C. line 362. The energization of 366 brings about a feed of the first card in the multiplying machine and passes it past the sensing brushes 109.

It may be explained that the circuit for clutch magnet 366, through LHF, relay points Z—2 and RHF is for starting purposes upon the passage of the first card through the machine and that upon subsequent operations upon subsequent cards, the control for starting up and card handling in the multiplying punch is through another shunt circuit, through contacts LHB and RHE.

It will be understood that after the first card has been fed, that relay points Z—2 will be opened by energization of coil Z to prevent restarting of the card feed through the LHF and RHF circuit. The manner in which Z is energized will be subsequently described.

It may be explained that two card feeding cycles are necessary on passing the first card through the machine and that on subsequent card feeds in the multiplying machine there is only one card feed cycle required.

The energization of coil H (Fig. 36e) also closes relay points H—2 (Fig. 36a) and establishes the customary A. C. impulse circuit to the contact roll 87 and to the brushes 109. Upon the passage of the card past the brushes 109 the amount of the multiplier, the multiplicand and the control number amount are entered respectively into the MP, the MC and the IC receiving devices. The MC counter magnets are designated 370MC, the multiplier magnets are designated 370MP and the control number indicating counter magnets are designated 370IC. The usual plug board is provided intermediate these various counter magnets and the brushes.

The entry circuits may be traced as follows: From the 363 side of the A. C. line, through relay points H—2, cam contacts FC—1, via impulse distributor 157, through roll 87, to the brushes and to the respective counter magnets.

The foregoing operations have entered the amounts from the main card in the multiplying punch into the entry devices of that section of the machine. Ultimately such card in the multiplier punch reaches the card tray in the punching section of this machine and closes card lever contacts 120 (Fig. 36e). Closure of such contacts energizes relay coil F. Energization of relay coil F opens contacts F—2 and closes contacts F—3. Energization of coil F also closes relay points F—4 and F—5 and the closure of F—5 causes relay coil Z to be energized. The energization of relay coil Z causes closure of stick points Z—1 which establishes a holding circuit through the normally closed relay points E—1, through the auxiliary stop key contacts 420 to the other side of the line. The energization of Z causes the opening of points Z—2 and prevents subsequent unwanted card feed cycles. The energization of coil F brings about two concurrent card feeding operations. One card feeding operation comprises a transit of the main card through the punching section of the multiplying machine and the other card feeding operation comprises a transit of the supplemental card through the supplemental punch. The manner in which card feed of the main card in the multiplying machine is brought about will be first described. The closure of contacts F—3 establishes a circuit through the punch rack clutch magnet 194 in the multiplying machine. The circuit through this magnet extends through eject contacts P—3 now closed, through CC—6 which close at the proper time in the cycle of the machine. The energization of clutch magnet 194 feeds the first main card endwise from the R position in the punch of the multiplying machine to the R—1 position. The energization of 194 also brings driving motor M—2 of the punch unit of the multiplying machine into operation by closing contacts 197. It has been explained before that such contacts 197, upon closure, are latched closed by a latch 198, which latch is released at the end of the rack stroke.

The foregoing has described the manner of feeding the main card in the multiplying punch from the R position to the R—1 position. While such main card endwise feed is occurring in the multiplying punch a corresponding card feed of the supplemental card is occurring in the supplemental punch. As explained before, the supplemental punch contains many elements corresponding to the elements of the punch of the multiplying machine and such common elements in the supplemental punch will be given similar reference numerals with the suffix S.

Figure 36D:
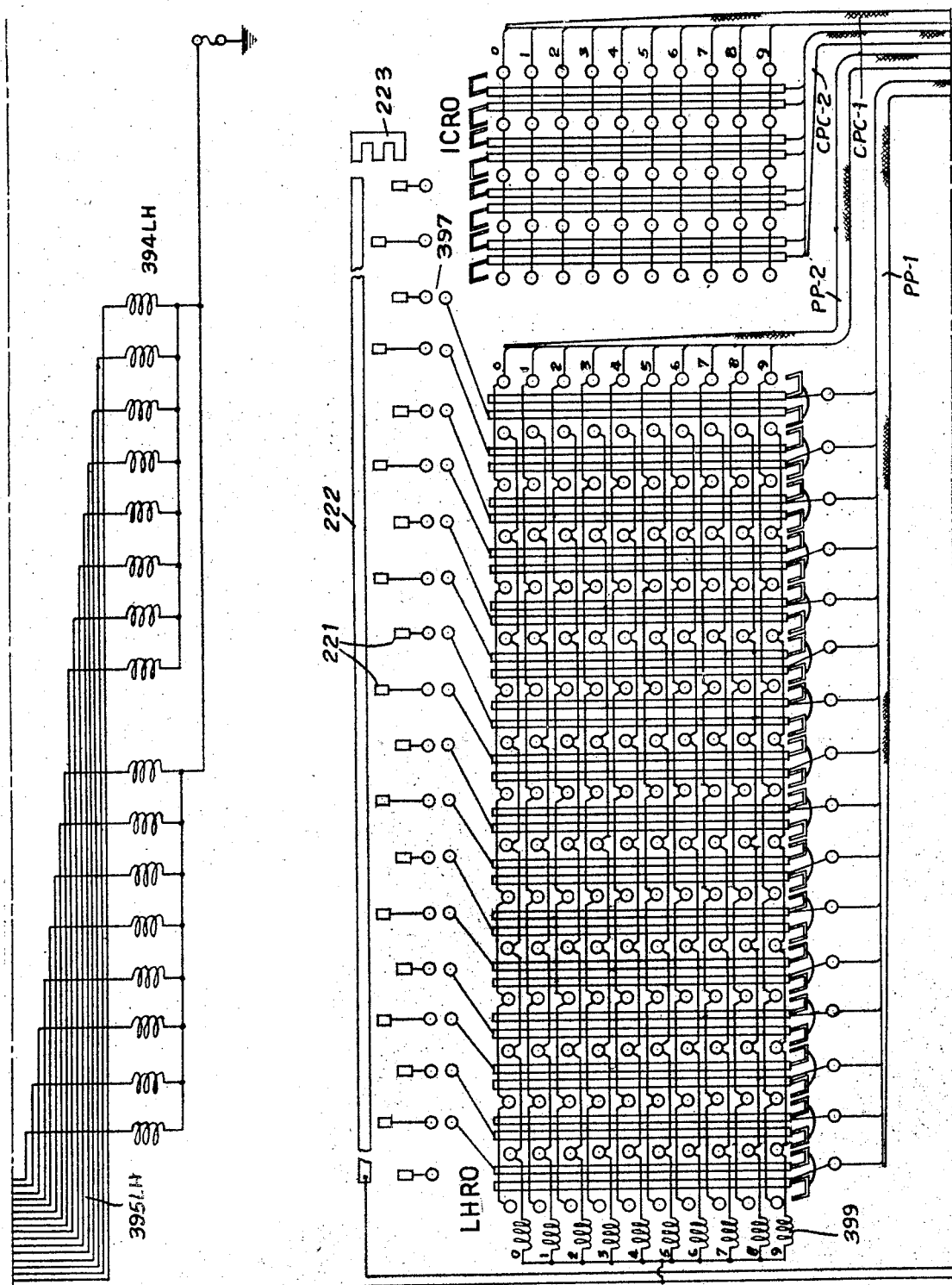

It may be explained that in the circuit diagram, circuits which are in the multiplying punch are shown on Figs. 36a, 36b, 36c, 36d, and 36e inclusive, and that the circuits which are in the supplemental punch are shown on Fig. 36f. Control circuits are also provided extending from one machine to the other and such circuits will be hereinafter set forth.

In the supplemental punch, the punch rack clutch magnet corresponding to magnet 194 in the multiplying punch is designated 194S (see Fig. 36f). A circuit is provided for such magnet from the 361 side of the D. C. line, through 194S, through P—3S now closed, through relay points F—4 now closed and which are in the multiplying punch (see Fig. 36e), through cam contacts CC—7, which contacts close at the same time in the cycle as cam contacts CC—6 previously referred to and back to the 362 side of the D. C line.

It will be understood from the foregoing that there is a control circuit which extends from the supplemental punch through controlling contacts, relays, etc. in the multiplying punch and such control circuit includes clutch magnet 194S in the supplemental punch. Contacts F—4 were closed by the energization of coil F and the energization of such coil also closes relay points F—1 (Fig. 36a). The closure of such contacts F—1 does not initiate any multiplying operation in the mutiplying punch until relay points R—1 or K—3 become closed.

It has been previously explained that in the multiplying machine, the energization of magnet 194 brought about the closure of contacts 197 and brought the motor M—2 of the punch unit of the multiplying machine into operation. Similarly in the supplemental machine the energization of 194S (Fig. 36f) causes the closure of contacts 197S and brings about the operation of motor M—2S. Contacts 197S are likewise latched closed by a latch 198S. Associated with contacts 197S are contacts 197AS, which contacts are adapted to open up and interrupt the circuit to the master card brush positioning magnet 292. The circuit to this brush positioning magnet is through control contacts 289, which contacts are closed if a master card is present in the master card tray of the punching machine and open if the master card is lacking. Contacts 197S are maintained closed during the motion of the rack parts in the supplemental machine and are released by the release of latch 198S at the end of the rack stroke.

The motor M—2S, when in operation, shifts the rack parts in the supplemental machine and feeds a supplemental card in such supplemental machine from the RS position to the intermediate RS—1 position. During such movement of the supplemental card such card passes under the brushes 293 and through the control perforations in the supplemental card establish circuits with the contact block 294. The brushes 293 are all individually wired to the wires in the comparison cable designated CPC—1. This cable extends from the supplemental punch up to the ICRO readout in the multiplying punch (see Fig. 36d). Another comparison cable CPC—2 is also wired up to the common segments of the ICRO readout (see Fig. 36d). The wires in the cable CPC—2 extend over and individually connect to relay coils 375 (Fig. 36f). According to the present embodiment eight of such relay coils 375 are shown and such relay coils provide for the comparison of an eight column control number. Each relay coil 375 has one of its ends connected to the corresponding wire in cable CPC—2 and has its opposite end connected to the socket of a plug board 376. The opposite side of the plug board connects to the spots 298 of the reading strip assemblage associated with the feed rack 181S of the supplemental punch. The common strip of this reading strip is designated 299 and the cooperating brushes 300. Associated with each coil 375 is a supplementary coil 377. The various coils similar to 377 are connected at one end to a line 378 which extends to the 362 side of the D. C. line. Cooperatively associated with the coils 375 and 377 and arranged to be attracted by the energization of either coil are armatures 379 adapted to be attracted upon the energization of coil 375 to close stick contacts 380 to a circuit 381 leading to the 361 side of the D. C. line through normally closed RHG contacts in the multiplying machine. The armatures 379 when attracted, also close other contacts 382. Contacts 382 are connected in series in a comparison circuit 383. The manner of making a comparison will be traced for a single column. It will be understood that the comparison is repeated successively column by column for all of the various columns in a supplemental card to be compared with the setup in the IC counter and upon the ICRO readout.

It will be assumed that the number which is set up in the left hand column in the ICRO readout and the number in the corresponding column of the supplementary card which passes under brushes 293, is 6. While the supplemental card is passing under the brushes 293, the card lever contacts 296 in the supplemental punch are closed and current accordingly flows from the 362 side of the D. C. line through contacts 296, through contact block 294, through the sixth brush of the 293 set to the sixth wire in cable CPC—1, thence through the wire and up across the sixth transverse bus of the ICRO readout, to the left hand segment spot at the sixth position, then via the brush of the readout and the common segment of the readout to the extreme left hand wire entering the CPC—2 cable, then down to the relay coil 375 which is in the extreme left hand position out via the plug board 376 to the extreme left hand spot 298, via brush 300, common strip 299 to the other side of the D. C. line 361.

It will be understood that coil 375 (in the extreme left hand position) is energized when the brush 300 makes contact with the related segment spot 298 and that upon the next step of card feed of the supplemental card if there is a comparison, there will be an energization of the next coil 375 to the right provided there is a matching comparison with that column of the ICRO readout. There is a successive energization of the various coils 375 provided there is a matching comparison of the control number amount in the supplementary card and the amount standing upon the ICRO readout. However, in the event that in any given column there is not a comparison, one of the magnets 375 will not become energized. In short, if the control numbers compare all of the coils 375 will ultimately become energized, but if there is a failure of comparison of the control numbers, one or more of such coils 375 will not have become energized during the traverse of the brush 300 for the reading strip.

In Fig. 36f, it may be explained that the brush 300 is shown as traversing for its reading operation from left to right, whereas in Fig. 28a such brush is shown to actually traverse from right to left. The left to right traverse according to the circuit diagram is shown for clarity of illustration. It may be explained that the spots of the reading strip are properly wired up for this purpose. In other words, on reading out operations for comparison, the supplemental card traverses under the brushes 293 from left to right. The reading is taken for the extreme left hand column through the extreme right hand spot of the reading strip and thence to the relay coil 375 which corresponds to that column and so on.

Upon the energization of each relay coil 375 its corresponding armature 379 will be attracted and a stick circuit will be established through coil 377 to maintain 379 attracted. The contacts 382 will also be closed and ultimately there will be a complete closure of the control circuit 383. As explained before the points 382 of the various relays are disposed in series in such control circuit 383. A number of switches 384 are also provided in a shunt circuit 385 which by-passes the various contacts 382 and by closing all of these switches 384 the comparison control can be completely cut out. By closing an individual switch 384 a comparison control can be cut out in a desired and corresponding column. Such columns can be selected at will by proper manipulation of switches 384.

The above switch control provides for the punching in the supplemental card without a comparing operation in one or more or all columns of the main and supplemental cards.

Upon completion of the comparison and upon final closure of all of the contacts 382, current flow occurs through a circuit from the 362 side of the D. C. line through all of the relay points 382 and out via wire 385, which wire extends up to a relay coil R in the multiplying machine (see Fig. 36e). Upon energization of relay coil R contacts R—1 (Fig. 36a) are closed. The machine is then ready to effect multiplication. Energization of relay R under comparison control initiates such multiplication.

Before describing the manner of initiating the multiplying operation upon comparison of the cards, the actions which occur upon a failure of a comparison will be described. If the pair of cards do not compare in their control members, relay coil R will not be energized. Also the main card and the supplemental card will be fed endwise through the respective punches either to punching position or to extreme left hand position. The operator then removes both sets of cards from the feed magazines of both machines and opens a switch 421 in the LC relay coil circuit and depresses the rack release keys 422S on the supplemental machine and a similar release key (not shown) on the multiplying punch unit. The depression of the release keys will cause the cards to be displaced to extreme left hand position in both machines from which position they may be manually removed. The failure of the comparison control will, however, leave a card in the feed unit of the multiplying machine. Such card is removed from the main machine by closure of two sets of switch contacts preferably operated from one error key on the multiplying punch but shown separated on the diagram. Such switch contacts are designated 423 and 424. Closure of contacts 423 causes energization of feed clutch magnet 366, which engages the feed rolls and causes the main card to be carried to the tray of the punching unit of the multiplying machine. From this position of the card the closure of the other contacts 424 causes the card to feed endwise to the extreme left hand end of the punch of the multiplying machine and such card is then manually removed from this position. This card so removed is replaced with the file of the main cards and may be visually compared with the first card of the supplemental file. Before the files of cards are replaced in the feed magazines of both machines, the MP, MC and IC counters may be reset by closure of special reset contacts which is effected by depressing a special reset key 425 (Fig. 36c). The machine is then entirely stopped by manually opening switch 360. The cards are then replaced in their respective card magazines and before starting up the machines the switch 421 should be reclosed and contacts 420, 423, 424 and 425 must be opened. The machine may then be restarted in operation by reclosure of main line switch 360 and the depressing of the start key contacts in the usual manner.

Referring to Fig. 36a, the zero bus 254 of the MPRO readout is wired to contacts CC—1 and the other side of these contacts connect to relay points F—1 and to a switch point of a switch 386. The switch 386 and the other side of points F—1 connect to a circuit 387 extending to a switch 388 which can be shifted to connect to relay points K—3 or to relay points R—1. The other side of the relay points K—3 and R—1 connect to the 362 side of the D. C. line.

For operation of the machine where comparisons are to be made, switch 388 is thrown to the position to connect to points R—I and for operations where no comparisons are to be effected, switch 388 is thrown to connect with points K—3 and to interrupt a circuit to the other relay points R—I. Switch 386 is shifted to closed position to shunt out contacts F—I when the multiplying punch and supplemental punch are to be used together and is thrown to open position when the multiplying punch is to be used alone and no punching operations are to be performed in the supplemental punch.

The cycle controller and zero column skipping arrangement of the multiplying punch herein shown is more fully described in the copending application of James M. Cunningham, Serial No. 606,585, filed April 21, 1932, but in brief it comprises a number of relay points Yu, Yt, Yh, etc., u, t and h designating units, tens and hundreds orders. The relay coils Y have two sets of relay points, one set Yu—I, Yt—I, etc., being stick contacts and the other sets of points being for column selection and column shift control purposes. Such other set is designated Yu—2, Yt—2, etc. The magnets of the CS relays previously referred to are designated CSu, CSt, CSh, etc. These column shift relays in addition to having the column shift control contacts which have been previously designated 150 and 151 have each an additional contact pair which will be given the general designation CSu—3, CSt—3, etc.

If any brush of the readout stands upon a zero spot its corresponding Y magnet will be energized, current flowing from the D. C. line 362 through relay points R—I, switch 388, wire 387, switch 386 now closed, through cam contacts CC—I, over via wire 254 to the zero spots of the readout. Thence via the corresponding brush or brushes standing on the zero spot or spots and then to the respective circuits shown to the respective Y magnets. It will be noted that with relay points R—I and switch 386 and with cam contacts CC—I closed, a circuit will be established to relay coils L and N. Energization of L will establish a stick circuit from the 362 side of the D. C. line through contacts RHC normally closed, relay points L—I, to relay coil L. Closure of relay points L—I will also establish a circuit from the D. C. line 362, through the RHC contacts now closed and through L—I to a circuit 389 which extends over and connects with one side of each of either of the CSu—3 to CStm—3 group or the Yu—I to Ytm—I group of contacts. The other side of these respective contacts are wired back to their corresponding Y magnets and therethrough to the other side of the D. C. line. Accordingly, when any Y magnet becomes energized due to a brush standing on the zero spot in the readout in its corresponding column, the energization of this Y magnet will establish its corresponding Y—I stick contacts and the Y magnet will remain energized by the current which flows over to it through line 389.

It will be assumed that the multiplier amount is such that there is no zero in the units order, that there is a zero in the tens order and that there is a significant figure in the hundreds order. With this condition, coil Yt will become energized and will be held energized by its stick relay points Yt—I. The energization of Yt will shift contacts Yt—2 to the reverse position from that shown. The stick circuit energization of the Yt magnet will maintain these contacts Yt—2 shifted. Yu—2 will not have been shifted because its corresponding Yu magnet has not been energized. The same will apply to the Yh—2 contacts.

The machine is now ready to multiply by the amount in the units order of the multiplier. Initiation of multiplication is effected in the following manner. On the closure of multiplication initiating circuit, through R—I, 386 and CC—I, a coil N is also energized, which coil is in parallel with relay coil L. Energization of this coil N closes its relay points N—I and current is allowed to flow from the A. C. line 363 through N—I, through the Yu—2 contacts which are in the position shown, thence down through the CSu magnet and out via the units brush of the MPRO readout which is standing on say the fifth spot and down through the fifth line of the group of wires generally designated 390 to the X—5 multiplying relay control magnet (see Fig. 36b) and back to ground. The time of flow of current through the path just traced is timed according to the closure of cam contacts CC—2 (Fig. 36b).

There will accordingly be a concurrent energization of the CSu magnet and the X—5 multiplier relay control magnet, such magnets being now in a series circuit. Energization of X—5 controls the emission of impulses for the proper multiplying computation from emitter 152 and the energization of CSu directs the entries into the proper columnar orders of the RH and LH accumulators.

It has been previously explained that when the multi-contacts of the CSu relay close, that an extra contact pair CSu—3 is also closed. This closure of the CSu—3 contact pair which takes place as an incident to the flow of current to the multiplying relay control magnet X, causes the energization of the Yu relay, which relay was not previously energized, its related brush not standing upon a zero spot. Energization of Yu then shifts the relay points Yu—I and Yu—2 so that upon a succeeding multiplication by the next significant figure current flowing in through N—I, will be diverted by the Yu—2 contacts over to the Yt—2 set of contacts which are in reverse position from that shown, thence over to the Yh—2 contacts which are in the position shown, since they have not been shifted by energization of Yh by a brush of the readout in the hundreds order standing on a zero spot. The next multiplying current impulse then flows through N—I, through Yh—2, through CSh, over through the brush of the readout to the particular wire of the 390 group, say the seventh wire and down through the X—7 magnet and out to ground upon closure of cam contacts CC—2 (Fig. 36b). Again there will be a concurrent energization of the X—7 magnet and the CSh column shift magnet and the energization of CSh will direct the proper entry of the impulses into the LH and RH accumulators at a shifted over columnar position therein.

After the multiplying computation is complete, cam contacts CC—4, (Fig. 36a) close. At the time such contacts close all of the Y—2 set of contacts will have been shifted to reverse position from that shown so that there is a circuit path from the 363 side of the A. C. line, through N—I, through all of the Y—2 set of contacts, through CC—4 now closed, through magnet 172RH and relay coil E and back to ground. The energization of relay coil E opens relay points E—1 (Fig. 36e) and breaks the stick circuit for relay coil Z. The manner of controlling the emission of differentially timed product representing impulses need not be traced in detail. It is sufficient to state that the energization of the X magnets of the multiplying relays establishes their related contacts as shown on Fig. 36b and at the proper time in the operation of the machine current impulses flow out from the emitter 152 through the multiplying relay control contacts and over to the set of lines 391RH and 391LH to the LH and RH sections of the multiplicand readout generally designated MCRO. The multiplicand readout allows selected impulses according to the amount of the multiplicand to flow out to the LH component lines designated 392LH and to the RH component lines 392RH. The lines 392LH and 392RH extend down to the various points 150 of the CS relays and the other points 151 of these relays connect to the LH lines 393LH and 393RH. The latter lines 393RH extend down to the counter magnets 394RH of the RH accumulator. The 393LH lines in place of extending directly to the counter magnets of the LH accumulator extend to the RH—2 to 16 (Fig. 36c) contacts and such contacts when in the position shown in the circuit diagram allow the impulses flowing over the 393LH lines to flow directly to the counter magnets 394LH (Fig. 36d).

By the foregoing circuits the LH and RH components of partial products are entered into the LH and RH accumulators and as successive multiplying cycles ensue for successive columnar orders of the multiplier in which significant figures appear, there is a selected energization of the CS magnets to direct the entries into the proper and shifted orders of the accumulators.

After the multiplying computation is complete the amount standing in the RH accumulator is transferred over into the LH accumulator. This is brought about by the energization of magnet 172RH (Fig. 36a) in the manner previously explained. Energization of 172RH shifts all of the RH—1 to 16 contacts (Fig. 36c) to reverse position and subsequently upon the operation of the emitter 153 impulses are emitted to the RHRO readout device and through the shifted RH—1 to 16 contacts to the lines 395LH which extend over to the LH accumulator magnets 394LH. At the completion of emission of impulses by the 153 emitter the emitter brush encounters an extra spot and through contacts RHA now closed, energizes a relay magnet 172LH. Energization of 172LH opens the contacts LHE and the opening of such contacts prevents a further transferring operation. The complete product is now standing in the LH accumulator and subsequently this resulting amount in the LH accumulator is read out to the punching device or devices.

It may be explained that the emitter 153 on encountering an extra leading spot establishes a circuit from the 363 side of the A. C. line, through contact LHE, through the emitter brush to a circuit leading through contacts RHB to reset magnets 396MP, 396MC, 396IC, which magnets bring about the resetting of the respective entry devices in the usual way. A switch 410 is provided in the circuit to 396MP for a purpose to be hereinafter explained.

In previous multiplying machines the LHRO readout was used for controlling punching operations and for also controlling the transfer amounts from the LH accumulator to the summary products accumulator. Accordingly, for such purposes the LHRO readout was provided with two sets of segment spots and two sets of common segments.

In the present machine no summary products accumulator is used, but the dual LHRO readout with its dual set of segments and dual set of spots is used for controlling two separate sets of punch selecting magnets. One of these sets of punch selecting magnets which is the set associated with the multiplying punch proper is shown at 399 on Fig. 36d and the readout to these punch selector magnets is controlled in the usual manner by means of the readout strip mechanism including brush 223, the readout spots 221 and the common strip 222. Supply of current for the common strip 222 is secured through a circuit which includes switch 398. When the main card in the multiplying punch is to be punched, such switch 398 is closed and if punching is not desired upon such main card such switch 398 is open. The alternating or other set of spots on the LHRO readout are wired by their transverse bus wires to wires in a cable PP—2, which cable extends down and is wired to the punch selector magnets 399S of the supplemental machine. The cooperating common set of segments of the LHRO readout have their brushes wired to wires in a cable PP—1 which extend from the LHRO readout in the multiplying machine to the sockets of a plug board 391S in the supplemental machine. The other sockets of this plug board are wired to spots 221S of the reading strip mechanism on the supplemental machine and the common conducting strip 222S of this reading strip is wired in circuit to be hereinafter described. The brush assemblage of this reading strip is designated 223S. The switch 400 is provided to allow current to flow or cut off current supply from reading strip 222S. Switch 400 is opened when punching is to be suppressed in the supplemental punch and closed when punching is desired in such punch.

When punching is to be effected either in the multiplying punch proper or in the supplemental machine or in both machines, a control circuit is established traced as follows. Referring to Fig. 36e current flows from the 362 side of the D. C. line through contacts LHC which become closed at the end of the multiplying operation, through cam contacts CC—3, which close at the proper time in the cycle, through relay coil B, to the other side of the D. C. line. Energization of coil B establishes a stick circuit through B—1. A path for current flow is also established through the escapement control contacts 215 on the punch in the multiplier unit and up to the reading strip 222, through switch 398. This circuit will provide for the punching of amounts in the punch of the multiplying machine when switch 398 is closed. The energization of coil B in the manner previously explained also closes relay points B—2 (Fig. 36e) and a circuit is established from the 362 side of the D. C. line through points B—2 via wire 401, through escapement control contacts 215S in the supplemental machine, via switch 400 to the common strip 222S. With the traverse of the reading brush 223S over its reading strip current flows successively through wires in the cable PP—1 up to the alternate segments of the LHRO readout, out via the spots of the readout, via the transverse buses to the wires in cable PP—2 and down back to the punch selector magnets 399S in the supplemental machine to the other side of the D. C. line 361. The supplemental machine then successively punches out the product in the usual way.

Master card punching

It has been previously explained that the supplemental machine includes a master card section with a master card for controlling punching operations in the supplemental machine. The punching control from the master card is secured in the following manner. 285 (Fig. 36f) are the master card sensing brushes which cooperate with the master card contact roll 286 through the perforations of the master card. The master card moves in the manner previously described column by column. A branch circuit 402 extends from the supply circuit leading to switch 400 over to the contact roll 286. The brushes 285 are wired to the punch selector magnets 399S. Upon traverse of the master card under the brushes 285 the perforations of the master card will selectively control the energization of the punch selector magnets 399S. It will be understood that such master card reading may be placed upon the supplementary card either before or after the punching of the product thereon or both before or after the punching of the product. The field of the master card which corresponds to the product to be punched will be left blank so there will be no master control effecting punchings on the supplementary card on this particular zone.

It will be understood that the plug connections on plug board 397S are properly plugged up to introduce the product into the proper and desired columns on the supplementary card and such plug connections are made corresponding to the blank zone on the master card providing a master card is used. When the master card is not in use the control contacts 289 are open and interrupt the circuit to the brush shifting magnet 292 and keep the brushes 285 from being raised up into cooperation with the contact roll 286.

Skip bars

Figure 31:
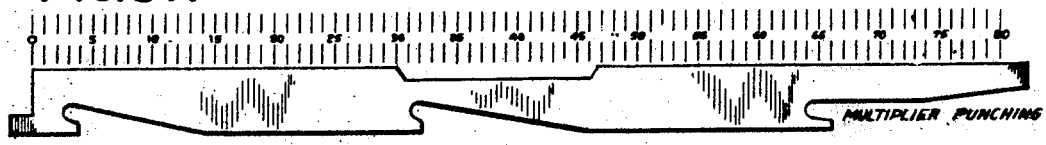
Figure 32:
Figure 33:
Figure 34:
Figure 35:
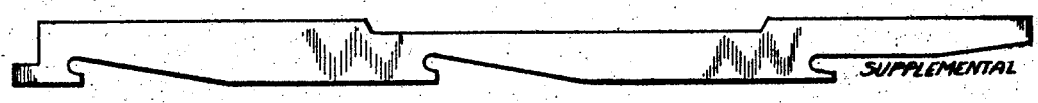

It may be explained that the punches of both the multiplying machine and the supplemental machine have removable skip bars. If products are to be punched into the cards of the multiplying machine a skip bar with a low portion is provided as shown in Fig. 31. If there is to be no punching of products at all in the multiplying machine the skip bar of Fig. 31 is removed and replaced with the skip bar such as shown in Fig. 32, having a continuous upper surface with no notched portion. Such skip bar of Fig. 32 could also be used in the supplemental machine if supplemental cards were to be compared but not punched. The other skip bars for the supplemental machine are shown in Figs. 33, 34 and 35. If the product alone from the multiplying machine is to be punched in the supplemental machine the skip bar with a single notched portion such as shown in Fig. 33 is used. If both products and master card data are to be punched in the supplemental machine the multiple notched skip bar such as shown in Fig. 34 may be used. Or alternately if the master card data and the product punched data are to be in adjacent zones the skip bar with the configuration shown in Fig. 35 can be used. The configuration and location of the notches are of course arranged according to where the data is to be punched in the particular cards and the amount of data to be punched.

It may be explained that if punching is to be effected in the supplemental machine and not in the multiplying machine the arrangement of the skip bar in the multiplying machine is such that after reaching the R—1 position the main card immediately skips over to the left hand column position. Such main card in the multiplying machine, however, is not ejected therefrom until punching is completed in the supplemental machine.

The actual operation of punching in either or both machines is effected in the customary manner, that is, the energization of magnets 399 or 399S as the case may be, or of both thrust forward the usual interposers and effect closure of contacts 403 and/or 403S and closure of such contacts energizes the punch magnets 404 and/or 404S.

In the multiplying machine contacts P—6 are provided which close when the main card therein escapes beyond the last column position. Corresponding contacts P—6S are provided in the supplemental machine which close when the supplementary card has escaped to a corresponding position. Also disposed in the multiplying machine are the customary eject contacts P—7 which contacts are closed at the time the card is introduced into the jaws of the ejector and which contacts open up on the ejecting movement of the jaws. Similar contacts P—7S are provided in the supplemental machine which operate in the same manner. Contacts P—6 (see Fig. 36e) are disposed in a circuit traced as follows. From the 361 side of the D. C. line through switch 421, through relay coil LC, through contacts P—6, through contacts P—7, thence via a wire 405 which extends over to the supplemental machine to contacts P—6S in that machine, thence via contacts P—7S in the supplemental machine and back by another wire 406 to the 362 side of the D. C. line.

When the main and supplemental cards in both machines have moved to a position beyond the last column in both machines, contacts P—6 and P—6S will be closed and contacts P—7 and P—7S will also be closed. Coil LC will thereupon become energized. The energization of LC closes relay points LC—1 (Fig. 36e) and completes a circuit to the eject magnet 232 in the multiplying machine. A similar circuit is established to the eject magnet 232S in the supplement machine through a path traced as follows. From the 362 side of the D. C. line, through relay points B—2 (Fig. 36e), relay points LC—3 which are closed by the energization of coil LC and via wire 407 which extends from the multiplying machine to the supplemental machine to the eject magnet 232S of the supplemental machine (see Fig. 36f). The energization of both eject magnets brings about the eject of both cards from the respective machines.

It has been previously explained that the initiation of multiplication was brought about by establishing a circuit through the series comparison circuit 383. This circuit is maintained during the multiplying operation until the transfer of the RH components to the LH components is initiated. At such time contacts RHG (Fig. 36e) open up, thereby interrupting the stick circuit 381, 378, through coils 377, etc., thereby allowing the armatures 379 to drop to open up the contacts 382 in the series comparison circuit 383 and thereby de-energizing relay coil R (Fig. 36e). The de-energization of relay coil R opens points R—1 (Fig. 36a) and prevents a further computing operation until a new comparison is made on the next feed of a new pair of cards.

It has been previously explained that the ejection of cards in both machines is controlled by the closure of relay points LC—1 and LC—3 under the control of coil LC. Provision must be made for eliminating the conjoint control when the multiplying machine is being used alone and no products are being punched in the supplemental machine. Such suppression of conjoint control is effected by means of a switch 408 which is in a shunt path around contacts P—6S and P—7S in the supplemental machine. With switch 408 closed the multiplying machine controls its own operations and does not depend for control upon actions in the supplemental machine.

Prior to the making of a new computation, provision is made to reset the RH and LH accumulators. Reset is effected in the following manner. Energization of coil LC (Fig. 36e) in the manner previously explained also closes points LC—2 and sets up a circuit from the left hand side of the D. C. line 361 through the RH and LH reset magnets 409RH and 409LH, through cam contacts CC—5 which close at the proper time, through relay points LC—2, through contacts LHD which are now closed. Reset of the RH and LH accumulators is then brought about in the usual way. The resetting action opens contacts LHD to prevent repetition of resetting operations.

The re-initiation of a new card handling and computing operation after the various operations have been performed upon one pair of cards is brought about in the following manner. After a "main" card moves out of the R station in the multiplying machine, card lever contacts 120 (Fig. 36e) break de-energizing coil F and allowing reclosure of contacts F—2.

Before the feed of a new card in the multiplying machine the MC, IC and possibly the MP counters will have been reset by the closure of contacts RHB which takes place early in the cycle during which the transfer of RH to LH components occurs. Upon the RH to LH transfer, contacts RHE close and remain closed until the LHB contacts (Fig. 36e) close upon energization of magnet 172LH. The closure of these LHB contacts after the closure of the RHE contacts sets up a circuit through the 366 card feed clutch magnet, through cam contacts FC—3 and relay points C—2 and initiates a new card feeding operation of a card in the multiplying punch. Such reinitiating circuit is established provided contacts P—1 are closed by the rack in the multiplying machine being properly disposed in suitable position to receive a new card at the R position.

It may be explained that undesired continuous card feed for cards other than the first card is prevented inasmuch as contacts F—2 open up as soon as a card has passed into the R position of the punch. Such control is brought about by the energization of coil F under the control of card lever contacts 120. Contacts P—3 prevent a premature feed of the card in the punch away from the R position until the multiplying punch parts are in proper position to receive a card.

It has been explained before that when the multiplying machine and the supplemental machine are used conjointly that switch 386 (Fig. 36a) is in closed position and switch 388 is in position to connect with points R—1. In cases where the multiplying machine is to be used alone switch 386 is thrown to open position, switch 388 is thrown to connect with points K—3 and then the initiation of multiplying operations is effected by the closure of relay points F—1 and K—3. The manner in which coil F is energized has been previously explained. The closure of relay points K—3 is brought about by energization of coil K upon the closure of the contacts P—2 in the punching section of the multiplying machine. Such closure occurs when the card carriage rack 182 has escaped to beyond the last column position.

Inasmuch as one of the uses of the present machine will be the making out of a number of product cards in the supplemental machine, which product cards includes the products derived from a fixed multiplier in the multiplying machine, and from varying multiplicands upon the main cards which pass through the multiplying punch section provision is made for preventing, when desired the resetting of the multiplier counter MP. To prevent such reset, a switch 410 is provided in the reset circuit for the MP reset magnet 396MP. With such use of the machine a card with the fixed multiplier amount only punched in it, is passed through the multiplying machine with the switch 410 open. The machine is stopped and the plug connections to the MP counter magnets 370MP are then removed and thereafter the machine is started up again to handle the file of multiplicand cards. The machine compares the control numbers on each main multiplicand card with the corresponding supplemental card and effects the multiplication of the multiplicand amount appearing on the main card by the fixed multiplier previously set in the machine and continues such operation as long as a comparison is obtained between the control numbers of the main cards and the control numbers of the supplemental cards.

In lieu of using the fixed multiplier arrangement just described, the rate card controls of such as shown in the copending application of James M. Cunningham, Serial No. 606,585, filed April 1, 1932, can be utilized.

Summarizing, the main uses of the present machine are as follows. A file of main cards can be placed in the multiplying punch prepunched with control numbers and with other data. Such cards in the main file may contain both multiplier and multiplicand data or they may contain multiplicand data alone and the multiplier can be placed as a fixed amount in the manner previously explained. Another file of supplemental cards with prepunched control numbers with or without other data thereon will be placed in the supplemental machine.

The machines can then be set in operation to run the separate files of cards through their respective machines, compare the control numbers of pairs of cards one from each file and upon comparison to initiate multiplication by the multiplying machine. The machines can be arranged to (1) punch the product obtained by the multiplying machine upon the supplemental card only; (2) punch the product upon both the supplemental and main cards; and (3) punch the product upon the main card only.

Master card data if desired, can be punched in any desired location upon the supplemental cards only.

The comparison control can be cut out completely or it can be cut out in selected columns. With such control completely or partially cut out the various punching operations (1), (2) and (3) set forth above can also be effected. Likewise master card readings can be placed on the supplemental cards when desired.

The multiplying punch can be used alone if desired by proper manipulation of the switches.

When the machines are set for comparing operations and the cards do not agree in their control numbers, there will be an endwise of the feed of the main card in the multiplying punch section. Such card, however, will not pass out to the discharge magazine. There is likewise a partial feed of the supplemental card in the supplemental machine, but such card will also not pass to the discharge magazine. Then the respective main and supplemental cards which have not agreed in their control numbers, will be removed from both machines by manipulation of the usual space keys provided on the machines for such purpose.

The IC, MP and MC counters of the multiplying machine will be cleared by hand by closing reset key 425. While the various switches have been previously described in connection with the circuit diagram a brief summary of the functions of these switches will be given here.

Switch 386 (Fig. 36a) is closed when both the multiplying punch and supplemental punch are to be used conjointly and is opened when the multiplying machine is to be used alone.

Switch 388 (Fig. 36e) is thrown to connect wire 387 with relay points R—1 when the multiplying punch and supplemental punch are to be used conjointly and is thrown to connect wire 387 with relay points K—3 when the multiplying punch is to be used alone.

Switch 410 is thrown to open position when a constant multiplier is to be used and is thrown to such position after the single card containing constant multiplier has been passed through the machine. The opening of this switch prevents resetting of the MP entry receiving device. Switch 410 will be closed when the multiplier is taken from each main card passing through the multiplying punch section.

Switch 398 is thrown to open position when there is to be no punching upon the main cards in the multiplying punch. It is closed when products are to be punched upon such main cards.

Switch 408 (Fig. 36f) is thrown to open position when the multiplying punch and the supplemental punch are to be used conjointly and is closed when the multiplying punch is to be used alone.

Switch 400 (Fig. 36f) is thrown to open position when there is to be no punching in the supplemental punch and is thrown to closed position when punching is to be effected in such supplemental punch.

Switches 384 when all thrown to open position provide for comparison control in all columns. When switches 384 are all closed, comparison in all columns is completely cut out. Switches 384 when displaced so that when some switches are closed and other switches are open there is provision for cutting out of comparison control in columns corresponding to the positions where switches are closed and provide comparison control on columns where the said switches are open.

Contacts 289 (Fig. 36f) which are in effect switch contacts, are closed when a master card is present in the master card tray and the gate latched down to retain such master card in position. Such contacts are open with the master card present and the gate unlatched. These contacts when closed provide for the reading off of data from the master card and when open prevent an undesired short circuit when no master card is present.

What we claim is:

1. An accounting machine including a pair of record handling machines, each of which feeds records one at a time and each successively index point column by index point column, record reading means in both machines, comparing means under the control of the record reading means of both machines, and supplemental inter-locking control means acting between both machines and cooperating with said comparing means to keep cyclic synchronization of operation of both machines.

2. The invention set forth in claim 1 in which at least one machine is provided with record making means to record the results of computation upon the records.

3. A record controlled machine including record reading means for concurrently sensing multiple columns of a record, a record handling means for sensing other records by successive column sensing, means to compare concurrently sensed data with successively sensed data, and means controlling machine operations in accordance with such comparisons.

4. A record controlled accounting machine including record handling and reading means for concurrently sensing multiple columns of a record, another record handling and reading device with provisions for sensing another record by successive column sensing operations, means for comparing concurrently sensed data derived from one record with successively sensed data derived from the other record, record making means, multiplying means, and means for controlling said multiplying means and record making operations of said record making means by the aforesaid comparing means.

5. An accounting apparatus comprising a main machine having record handling means, record reading means for reading factor data from handled records, multiplying means receiving entries from the reading means for multiplying the entered factors read from the records and for setting up a product, a second record handling machine mechanically separate from but electrically connected to the main machine with separate record handling means for handling a separate set of records, recording means in the second machine, means for controlling the recording means from the multiplying means of the main machine whereby results of computations performed in the main machine may be recorded upon the separate set of records handled by the second machine, means for automatically initiating recording operations by the second machine upon completion of multiplying operations by the main machine, and control means acting between both machines to preserve cyclic synchronization of operation in both machines in their record handling operations.

6. An accounting apparatus comprising a main machine having record handling means, record reading means for reading factor data from handled records, multiplying means receiving entries from the reading means for multiplying the entered factors read from the records and for setting up a product, recording means in the main machine, a second record handling machine mechanically separate from but electrically connected to the main machine with separate record handling means for handling a separate set of records, recording means in the second machine, means for controlling the recording means of both machines from the multiplying means of the main machine whereby results of computations performed in the main machine may be recorded upon each of the separate set of records handled by the main machine and by the second machine and control means acting between both machines to preserve cyclic synchronization of operation in both machines with respect to card handling of the cards in both machines.

7. An accounting apparatus comprising a main machine having record handling means, record reading means for reading factor data from handled records, multiplying means receiving entries from the reading means for multiplying the entered factors read from the records and for setting up a product, a second record handling machine mechanically separate from but electrically connected to the main machine with separate record handling means for handling a separate set of records, record reading means in the second machine and data comparing means controlled from the reading means of both machines for comparing data read from the records of both sets, and means controlled by the aforesaid comparing means for initiating a multiplying computation in the main machine upon an agreement of the compared data.

8. The invention set forth in claim 7 in which at least one of the machines is provided with recording means and wherein means is provided effective upon the completion of a multiplying computation for controlling and causing operation of said recording means.

9. The invention set forth in claim 7 in which both the main machine and the second machine are provided with recording means and wherein means are provided effective upon completion of a multiplying computation in the main machine for causing and controlling recording operations in both machines.

10. A record controlled accounting machine including record handling and record reading means for handling and for concurrently sensing multiple columns of a record, another record handling and record reading means for sensing other records by successive column sensing actions, comparing devices to compare concurrently sensed data read from one record with successively sensed data read from another record and machine control means for controlling machine operations in accordance with such comparison.

11. A record controlled accounting machine including record handling and record reading means for handling and for concurrently sensing multiple columns of records of one set, another record handling and record reading means for handling and sensing other records of another set by successive column sensing actions, comparing devices to compare concurrently sensed data read from a record of one set with successively sensed data read from the record of the other set, multiplying means and record making means, and means controlled from the comparing devices for controlling multiplying operations and record making.

12. An accounting apparatus including a main machine provided with record handling means, record reading means, multiplying means receiving data read in from a record by the said reading means and product setup means, a separate record handling and record recording machine mechanically separate from the main machine and controlled therefrom solely by electrical wiring connections, means for controlling recording upon the records handled by the separate machine from the product setup means of the main machine after a multiplying computation has been made in the main machine, control means for controlling the conjoint operations of both the main machine and the remote machine, said last two mentioned means including circuits extending through the aforesaid electrical wiring connections, operation initiating means for both machines to initiate recording at the proper time in the separate machine after multiplying has been completed in the main machine and to also initiate resumption of multiplying operations in the main machine after recording has been completed, said last mentioned means including control means compelling completion of recording and card handling operations in both machines before re-initiating a new multiplying operation in the main machine.

13. A record controlled accounting machine including two mechanically separate and separately driven record handling machines which are solely inter-connected for cooperative action by electrical wiring connections, each machine having card handling mechanism of the type which handles records by a step by step successive index column feed action, record reading means in both machines, comparing means under the control of the reading means of both machines, and supplemental control means acting between both machines and including circuits in the aforesaid wiring connections, said supplemental control means cooperating with said comparing means to keep cyclic synchronization operation of both machines.

14. An accounting apparatus comprising a main machine having record handling means, record reading means and recording means, a second record handling and record making machine mechanically separate from but electrically connected to the main machine with separate record handling means for handling a separate set of records, record reading means in the second machine, and comparing means controlled from the record reading means which cooperates with a record in each of two different and separately handled sets for preventing recording operations when the control data upon the compared records fails to agree and to provide for a recording by the recording devices in both machines upon an agreement of the control data.

15. A record controlled accounting machine including a main machine having record handling means, record reading means and data recording means, a second record handling machine mechanically separate from but electrically connected to the main machine with separate record handling means for handling a separate set of records, record reading means in the second machine, data recording means in the second machine, comparing means to compare control data read from a record by the reading means in the main machine with control data read from a record by the reading means in the second machine, and means for effecting a recording operation by the recording devices in the main machine and by the recording devices in the second machine when the control data agrees.

16. An accounting machine including a pair of record handling and record reading machines, at least one of which includes record making means, inter-controls between the said machines for comparing control data upon individual records handled by one machine with control data upon individual records handled by the other machine, multiplying means in one of said machines receiving entries from the records handled thereby, means under the control of the comparing means upon agreement of the compared data for controlling the continued operation of both machines including the effecting of multiplying computations by the multiplying means, and means providing for the making of product records in the machine provided with record making means under the control of the multiplying means and upon the continued operation of both machines upon agreement of the compared control data upon the records.

17. An accounting machine including a main record handling and multiplying computing machine and a concurrently operating supplemental separate record handling and record reading machine, means for reading records as they pass through the main machine, means for reading records as they pass through the second supplemental machine, means for effecting multiplying computing operations in the main machine including entry receiving means controlled by the reading means of the main machine, record making means for recording the results of multiplying computations, means controlled by the reading means of both machines for comparing control data of a pair of records which are being concurrently handled by both machines, control means effective upon an agreement of control data to initiate a multiplying computation and means effective upon completion of such computation to bring about the making of a record of the result of the multiplying computations.

18. The invention set forth in claim 17 in which the supplemental machine includes record making means, which means is controlled by the main computing machine.

19. An accounting machine including a main record handling and multiplying computing machine and a concurrently operating supplemental separate record handling and record reading machine, means for reading records as they pass through the main machine, means for reading records as they pass through the second supplemental machine, means for effecting multiplying computing operations in the main machine including entry receiving means controlled by the reading means of the main machine, means controlled by the reading means of both machines and including comparing means for comparing control data of a pair of records, means effective upon agreement of the compared data to initiate a multiplying computation, record making means in the main machine for recording the results of the computation, means effective upon completion of computing for causing recording, said means being effective to prevent the making of records when multiplication has not been performed when readings of records in the main machine do not agree with readings of records in the supplemental machine.

20. An accounting machine including a main record handling and multiplying computing machine and a concurrently operating supplemental separate record handling and record reading machine, means for reading records as they pass through the main machine, means for reading records as they pass through the second supplemental machine, means for effecting multiplying computing operations in the main machine entry receiving means controlled by the reading means of the main machine, means controlled by the reading means of both machines and including comparing means for comparing control data of a pair of records, means effective upon agreement of the compared data to initiate a multiplying computation, record making means in both the main and supplemental machines for recording the results of the computation, means effective upon completion of computing for causing recording by both of said record making means, said means being effective to prevent the making of records in both machines when multiplication has not been performed when readings of records in the main machine do not agree with readings of records in the supplemental machine.

21. The invention set forth in claim 20 in which means are provided in the main machine for suppressing when desired, the recording of the result of the computation made in such main machine.

22. The invention set forth in claim 20 wherein means are provided in the main machine for suppressing when desired, the recording of the result of the computation made in such main machine and including means in the supplemental main machine for suppressing when desired, the result of the computation obtained in the main machine upon the compared record in the supplemental machine.

23. A record controlled accounting machine having provisions for handling two separate sets of records concurrently, means for analyzing and comparing control data of a pair of records from the two sets, means for receiving entry of factors from a record of one set and for effecting multiplication of said factors, means effective upon agreement of the compared data for initiating the multiplying computation, and means effective upon the completion of said computation for recording upon the record of the other set the result of said computation.

24. A record controlled accounting machine having provisions for handling two separate sets of records concurrently, means for analyzing and comparing control data of a pair of records from the two sets, means for receiving entry of factors from a record of one set and for effecting multiplication of said factors, means effective upon agreement of the compared data for initiating the multiplying computation, means effective upon the completion of said computation for recording upon the record of the other set the result of said computation, and means for recording the results of a computation also upon the record of the set from which the factor data entering into the computation is derived.

25. A record controlled accounting machine having provisions for handling two separate sets of records concurrently, means for analyzing and comparing control data of a pair of records from the two sets, means for receiving entry of factors from a record of one set and for effecting multiplication of said factors, means effective upon agreement of the compared data for initiating the multiplying computation, means effective upon the completion of said computation for recording upon the record of the other set the result of said computation, and auxiliary means for recording supplemental data upon the records of one set.

26. An accounting machine including a pair of record handling machines for handling two separate sets of records concurrently, means for analyzing and comparing control data of a pair of records from the two sets, means for receiving entry of factors from a record of one set and for effecting multiplication of said factors, means effective upon agreement of the compared data for initiating the multiplying computation, record making means for recording results of the multiplying computation and means effective upon the completion of the aforesaid multiplying computation for causing the aforesaid recording means to become effective to record the result of the computation.

27. An accounting machine which includes a pair of record handling means which comprises a main machine and a supplemental machine for handling two sets of records concurrently, record analyzing means in both machines, means controlled by the analyzing means of both machines for comparing control data of a pair of records being handled by both machines, means for receiving entry of factors from the analyzing means of the main machine and for effecting multiplication of said factors, means effective upon agreement of the compared data for initiating the multiplying computation, record making means in the main machine and record making means in the supplemental machine for recording results of the computation upon the records handled by both machines and means effective upon the completion of the multiplying computation for causing such recording.

JAMES W. BRYCE.
GEORGE F. DALY.